US012066997B2

(12) United States Patent
Gangwar et al.

(10) Patent No.: US 12,066,997 B2
(45) Date of Patent: Aug. 20, 2024

(54) DETERMINATION OF DATA CONSISTENCY IN DISTRIBUTED ASYNCHRONOUS ARCHITECTURE

(71) Applicant: MASTERCARD INTERNATIONAL INCORPORATED, Purchase, NY (US)

(72) Inventors: Geetkumar Subhashchandra Gangwar, Vadodara (IN); Gaurav Jain, Pune (IN); Hitesh Mrig, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 151 days.

(21) Appl. No.: 16/889,389

(22) Filed: Jun. 1, 2020

(65) Prior Publication Data

US 2021/0019303 A1    Jan. 21, 2021

(30) Foreign Application Priority Data

Jul. 16, 2019    (SG) .......................... 10201906587Q

(51) Int. Cl.
*G06F 16/23* (2019.01)
*G06N 20/00* (2019.01)
*G06Q 20/02* (2012.01)
*G06Q 20/40* (2012.01)
*G06Q 30/018* (2023.01)
*H04L 67/10* (2022.01)

(52) U.S. Cl.
CPC ......... *G06F 16/2365* (2019.01); *G06N 20/00* (2019.01); *G06Q 20/027* (2013.01); *G06Q 20/405* (2013.01); *G06Q 30/0185* (2013.01); *H04L 67/10* (2013.01)

(58) Field of Classification Search
CPC .. G06Q 40/025; G06Q 20/3224; G06Q 20/38; G06Q 20/389; G06Q 20/22; G06Q 10/0639; G06Q 20/027; G06Q 20/405; G06Q 30/0185; G06F 16/2365; G06F 16/273; G06N 20/00; H04L 67/10
USPC ........................................................ 709/224
See application file for complete search history.

(56) References Cited

U.S. PATENT DOCUMENTS 11,507,562 B1* 11/2022 Luedtke ............. G06F 16/2228
2004/0089711 A1* 5/2004 Sandru .................. G06Q 40/00
235/379

(Continued)

*Primary Examiner* — Mohamed A. Wasel
(74) *Attorney, Agent, or Firm* — Pillsbury Winthrop Shaw Pittman LLP

(57) ABSTRACT

A method for determining data consistency in a distributed asynchronous architecture is provided. A server receives transaction requests for processing transactions. The server offers one or more services for processing each transaction. Execution of a service for a transaction corresponds to partial processing of the corresponding transaction. The server generates, for each transaction, one or more disposition messages based on the execution of the one or more services. The server aggregates, for each transaction, the generated one or more disposition messages based on a unique identifier of a corresponding transaction and determines a data consistency rate based on the aggregated one or more disposition messages and a set of rules. The set of rules defines one or more standard sequences for executing the one or more services for processing each transaction.

20 Claims, 13 Drawing Sheets

(56) References Cited

U.S. PATENT DOCUMENTS

| | | | | |
|---|---|---|---|---|
| 2010/0327056 A1* | 12/2010 | Yoshikawa | ........ | G06Q 20/4016 235/380 |
| 2013/0167047 A1* | 6/2013 | Pujari | ..................... | G06F 3/048 715/762 |
| 2014/0250018 A1* | 9/2014 | Phillips | ................ | G06Q 20/405 705/72 |
| 2016/0078439 A1* | 3/2016 | Vanska | ............. | G06Q 30/0633 705/44 |
| 2016/0098697 A1* | 4/2016 | Dunsmore | ............. | G06Q 20/32 705/39 |
| 2016/0260040 A1* | 9/2016 | Zhou | .................... | G06F 9/4843 |
| 2017/0126627 A1* | 5/2017 | Yang | ................. | H04L 63/1416 |
| 2017/0213204 A1* | 7/2017 | Massoudi | ............. | G06Q 20/34 |
| 2018/0060376 A1* | 3/2018 | Mao | ..................... | G06F 16/958 |
| 2019/0364019 A1* | 11/2019 | Yang | ................. | H04L 63/0281 |
| 2020/0265435 A1* | 8/2020 | Bankston | ........... | G06Q 20/4014 |
| 2020/0374305 A1* | 11/2020 | Kursun | ................. | G06N 5/047 |

\* cited by examiner

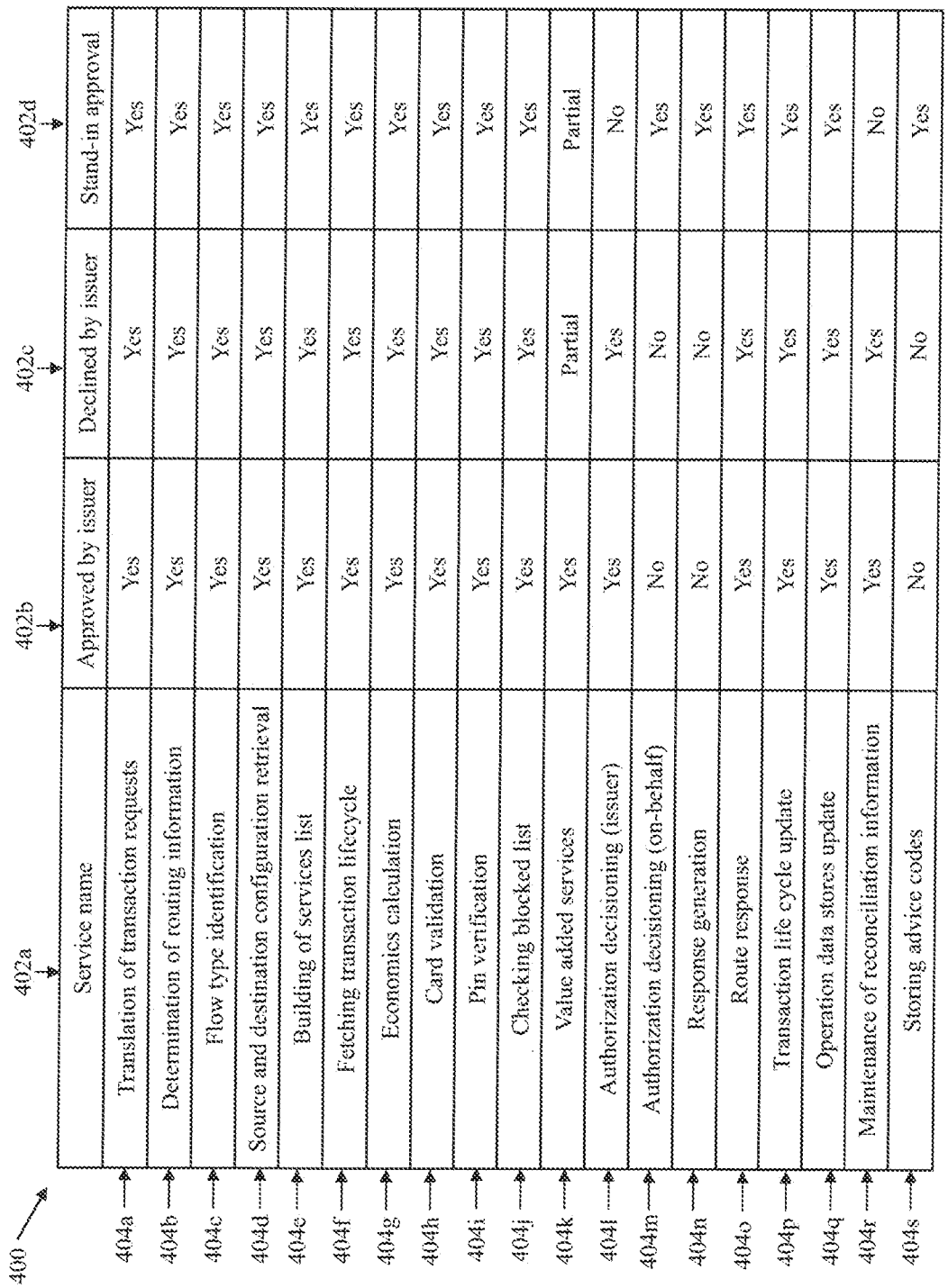

FIG. 4

| Service name | Approved by issuer | Declined by issuer | Stand-in approval |
|---|---|---|---|
| Translation of transaction requests | Yes | Yes | Yes |
| Determination of routing information | Yes | Yes | Yes |
| Flow type identification | Yes | Yes | Yes |
| Source and destination configuration retrieval | Yes | Yes | Yes |
| Building of services list | Yes | Yes | Yes |
| Fetching transaction lifecycle | Yes | Yes | Yes |
| Economics calculation | Yes | Yes | Yes |
| Card validation | Yes | Yes | Yes |
| Pin verification | Yes | Yes | Yes |
| Checking blocked list | Yes | Partial | Partial |
| Value added services | Yes | Yes | No |
| Authorization decisioning (issuer) | No | No | Yes |
| Authorization decisioning (on-behalf) | No | No | Yes |
| Response generation | Yes | Yes | Yes |
| Route response | Yes | Yes | Yes |
| Transaction life cycle update | Yes | Yes | Yes |
| Operation data stores update | Yes | Yes | Yes |
| Maintenance of reconciliation information | Yes | Yes | No |
| Storing advice codes | No | No | Yes |

DETERMINATION OF DATA CONSISTENCY IN DISTRIBUTED ASYNCHRONOUS ARCHITECTURE

CROSS-REFERENCE TO RELATED APPLICATIONS

This application claims priority to Singaporean Application Serial No. 10201906587Q, filed Jul. 16, 2019, which is incorporated herein by reference in its entirety.

FIELD OF THE DISCLOSURE

Various embodiments of the disclosure relate generally to transaction processing systems. More specifically, various embodiments of the disclosure relate to determination of data consistency rate in a distributed asynchronous architecture.

BACKGROUND

With the advancement of technology, electronic transactions have become a preferred means for making payments. Typically, a transaction processing system, for example, a payment network system, divides the processing of an electronic transaction into various smaller tasks. Examples of such tasks may include translation of a transaction request to a compatible message format, blocking check, generation of a transaction response, or the like. Each task is executed by means of a dedicated service offered by the transaction processing system. For the sake of better scalability, transaction processing systems these days are based on distributed network system having multiple data centers with corresponding local databases. Such a distributed transaction processing system may be either based on a synchronous architecture or an asynchronous architecture for processing electronic transactions.

In a scenario where the distributed transaction processing system is based on the synchronous architecture, the tasks required for processing an electronic transaction may be executed in a specific sequence such that execution of each task is initiated on or after the completion of a previous task. Thus, in the synchronous architecture, an entity that makes a service call, for execution of a task, may wait for completion of the execution of the task before initiating the next task. Therefore, in the synchronous architecture, execution of a next task is blocked until a previous task is completely executed. Therefore, the distributed transaction processing system based on the synchronous architecture may be consistent across the local databases. However, such transaction processing system has low transaction processing rate. Drawbacks of the synchronous architecture may be rectified by a distributed transaction processing system employing the asynchronous architecture. In the asynchronous architecture, tasks that are not dependent on each other may be executed in parallel, thereby improving the transaction processing rate of the transaction processing system. Moreover, in the asynchronous architecture, an entity that makes a service call, for execution of a task, may not wait for a response regarding the execution of the task and may initiate a next task. The entity may queue multiple requests for processing without waiting for the response regarding the execution of the current task. While the distributed transaction processing system based on the asynchronous architecture may be eventually consistent, there is no way to determine a data consistency rate of the transaction processing system, at any time-instant, with certainty.

In light of the foregoing, there is a need for a technical solution that enables a distributed transaction processing system that is based on an asynchronous architecture to determine data consistency rate at any time-instant.

SUMMARY

In an embodiment of the present disclosure, a method for determining data consistency in a distributed asynchronous architecture is provided. The method includes receiving, by an edge node of a server, a plurality of transaction requests for processing a plurality of transactions. Each of the plurality of transaction requests invokes one or more services offered by the server for processing the plurality of transactions. For each of the plurality of transactions, the invoked one or more services are executed by one or more service nodes of the server. Execution of a service of the invoked one or more services for each of the plurality of transactions corresponds to at least partial processing of each transaction. Based on the execution of the invoked one or more services, one or more disposition messages are generated by the one or more service nodes. Each of the generated one or more disposition messages is indicative of a unique identifier of a corresponding transaction and a timestamp indicative of a time of completion of the execution of a corresponding service of the invoked one or more services. For each transaction, the generated one or more disposition messages are aggregated by a data consistency monitor (DCM) of the server, based on the corresponding unique identifier. A data consistency rate is determined by the DCM at a first time-instant, based on the aggregated one or more disposition messages and a set of rules. The set of rules defines one or more standard sequences for executing the one or more services for each of the plurality of transactions.

In another embodiment of the present disclosure, a system for determining data consistency in a distributed asynchronous architecture is provided. The system includes an edge node configured to receive a plurality of transaction requests for processing a plurality of transactions. Each of the plurality of transaction requests invokes one or more services for processing the plurality of transactions. The system further includes one or more service nodes that are communicatively coupled to the edge node and configured to execute the invoked one or more services for each of the plurality of transactions. Execution of a service of the invoked one or more services for each of the plurality of transactions corresponds to at least partial processing of each transaction. The one or more service nodes are further configured to generate one or more disposition messages based on the execution of the invoked one or more services. Each of the generated one or more disposition messages is indicative of a unique identifier of a corresponding transaction and a timestamp indicative of a time of completion of the execution of a corresponding service of the invoked one or more services. The system further includes a data consistency monitor (DCM) that is communicatively coupled to the edge node and the one or more service nodes. The DCM is configured to aggregate the generated one or more disposition messages for each of the plurality of transactions based on the corresponding unique identifier. The DCM is further configured to determine, at a first time-instant, a data consistency rate based on the aggregated one or more disposition messages for each of the plurality of transactions and a set of rules. The set of rules defines one or more standard sequences for executing the invoked one or more services for each of the plurality of transactions.

BRIEF DESCRIPTION OF THE DRAWINGS

Various embodiments of the present disclosure are illustrated by way of example, and not limited by the appended figures, in which like references indicate similar elements, and in which:

FIG. 4 is a Table that illustrates various services offered by the payment network server for processing transactions, in accordance with an exemplary embodiment of the disclosure;

Figure 1:
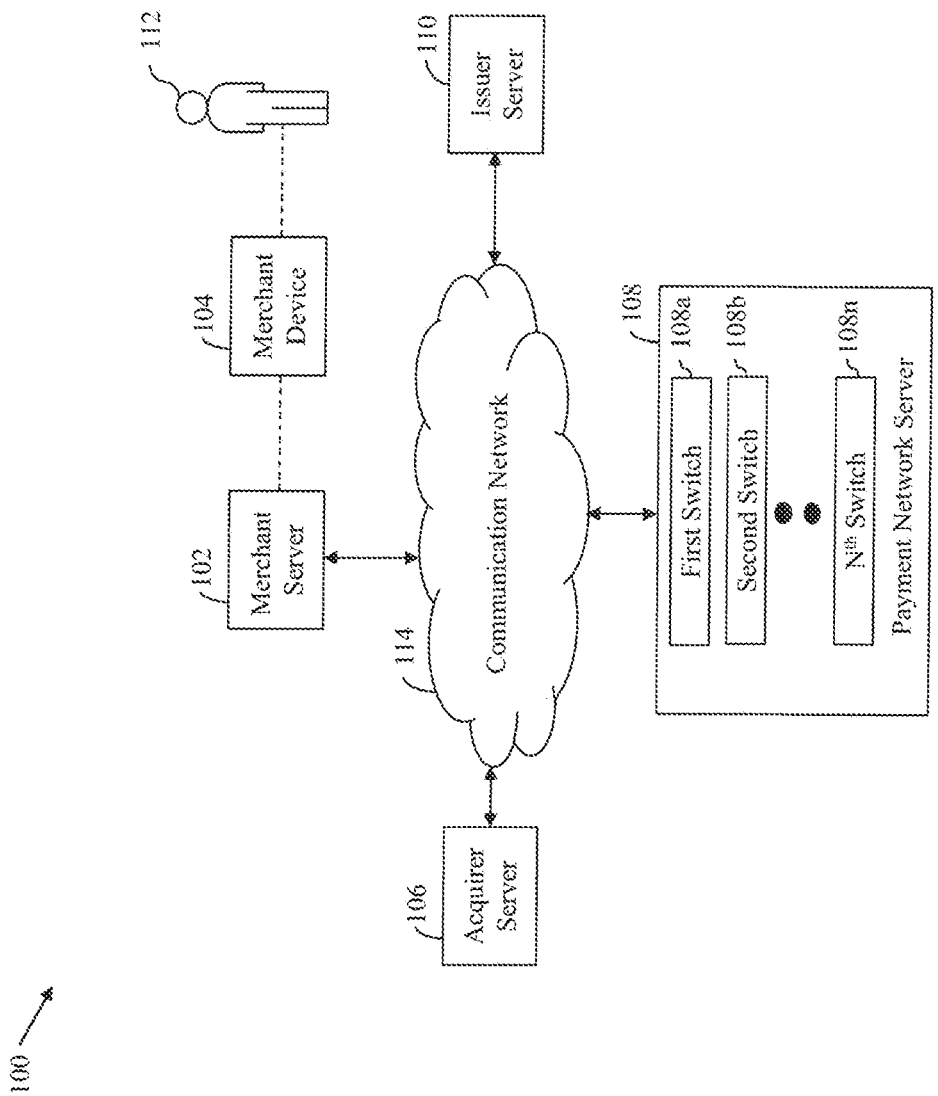
FIG. 1 is a block diagram that illustrates an exemplary environment for determining data consistency in a distributed asynchronous architecture, in accordance with an exemplary embodiment of the present disclosure.

Further areas of applicability of the present disclosure will become apparent from the detailed description provided hereinafter. It should be understood that the detailed description of exemplary embodiments is intended for illustration purposes only and is, therefore, not intended to necessarily limit the scope of the present disclosure.

DETAILED DESCRIPTION

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. In one example, the teachings presented and the needs of a particular application may yield multiple alternate and suitable approaches to implement the functionality of any detail described herein. Therefore, any approach may extend beyond the particular implementation choices in the following embodiments that are described and shown.

References to "an embodiment", "another embodiment", "yet another embodiment", "one example", "another example", "yet another example", "for example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Overview

A transaction processing system (e.g., a payment network) that is based on a distributed asynchronous architecture may be eventually consistent. However, there is no way to determine a data consistency rate of the transaction processing system with certainty at any time-instant.

Various embodiments of the present disclosure provide a method and a system that solve the aforementioned problem by enabling the determination of the data consistency rate at any time-instant. A payment network server associated with the payment network may include an edge node configured to receive various transaction requests from an acquirer server. In an embodiment, the various transaction requests may be requests for authorization of various transactions initiated by various users. Each transaction request may invoke one or more services (e.g., translation, blocking check, generation of a transaction response, or the like) offered by the payment network server for processing the transactions. Execution of a service, of the one or more services, for each transaction may correspond to at least partial processing of the corresponding transaction. Since, the payment network server is based on the distributed asynchronous architecture, multiple services, of the one or more services, may be executed in parallel for each transaction. Based on the execution of the one or more services for each transaction, one or more disposition messages may be generated, respectively. The one or more disposition messages may be generated by one or more service nodes of the payment network server that execute the one or more services, respectively. Each disposition message may be indicative of a unique identifier assigned to the corresponding transaction and a timestamp indicative of a time of completion of the execution of the corresponding service.

A data consistency monitor (DCM) of the payment network server may be configured to aggregate the generated one or more disposition messages for each transaction based on the unique identifier associated with the corresponding transaction. To measure data consistency, the DCM may be configured to determine, at a first time-instant, a data consistency rate based on the aggregated one or more disposition messages and a set of rules defined by the payment network. The set of rules may define one or more standard sequences for executing the one or more services for processing each transaction. The data consistency rate at the first time-instant is indicative of a count of transactions, of the various transactions, that are successfully processed by the payment network server as per the set of rules. In one exemplary scenario, the payment network server may have received a hundred transaction requests corresponding to a hundred transactions, respectively, prior to the first time-instant and the data consistency rate at the first time-instant may be determined to be '100%'. In such a scenario, the data consistency rate indicates that the hundred transactions are successfully processed by the payment network server by the first time-instant as per the set of rules. In another exemplary scenario, the payment network server may have received a hundred transaction requests corresponding to a hundred transactions, respectively, prior to the first time-instant and the data consistency rate at the first time-instant may be determined to be '80%'. In such a scenario, the data consistency rate indicates that only eighty of the hundred transactions are successfully processed by the payment network server by the first time-instant as per the set of rules.

Thus, the method and system of the present disclosure enable the determination of a data consistency rate of the transaction processing system at any time-instant.

Terms Description (in Addition to Plain and Dictionary Meaning)

Transaction request is a request that is generated based on a transaction initiated by a user. The transaction request may indicate a transaction amount of the transaction, a purchase category of the transaction, or the like. For example, a first transaction request may be generated when the user makes a purchase of a product (e.g., a mobile phone) from a merchant store. The first transaction request may indicate a price of the product, a purchase category (e.g., 'Electronics'), or the like.

Edge node may be a node of a distributed transaction processing system (e.g., a payment network server) that receives transaction requests from an acquirer server of an acquirer and communicate transaction responses to the acquirer server. The edge node may act as a bridge between the payment network server and the acquirer server. In other words, the edge node may execute various services that enable the payment network server to receive the transaction requests from the acquirer server and communicate the transaction responses to the acquirer server.

Service is a process, executable by one or more nodes of a transaction processing system (e.g., a payment network server) for processing a transaction. The processing of the transaction may be divided into one or more smaller tasks such that executing a service for the transaction corresponds to performing a corresponding task of the one or more smaller tasks. For example, the payment network server may offer a first service for translating a first transaction request to a first message format compatible with the payment network server, when the first transaction request is in any other message format.

Service node is a node, of a distributed transaction processing system (e.g., a payment network server), capable of executing one or more services for processing a transaction. For example, a first service node may execute a first service for translating a first transaction request to a first message format compatible with the payment network server. Edge node is also an example of a service node.

Disposition message is a message generated by a service node (i.e., by an edge node, an orchestration service node, or other service nodes) of a server. A service node may generate a disposition message on execution of a corresponding service for processing a transaction. Each disposition message may be indicative of at least a unique identifier of a corresponding transaction and a timestamp indicative of a time of completion of the corresponding service.

Data consistency rate at a first time-instant represents a count of transactions successfully processed by a transaction processing system (e.g., a payment network server), as per a set of rules, by the first time-instant. For example, a data consistency rate of '100%' at the first time-instant may indicate that all transactions associated with transaction requests received on or before the first time-instant are successfully processed as per the set of rules. Similarly, a data consistency rate of '50%' at the first time-instant may indicate that half of the transactions associated with the transaction requests received on or before the first time-instant are successfully processed as per the set of rules.

Set of rules defines one or more standard sequences for execution of services for processing a transaction. Each standard sequence is indicative of a sequence in which various services are to be executed for processing the transaction. A transaction may be considered to be successfully processed if a sequence of services, executed for processing the transaction, is same as one of the one or more standard sequences defined by the set of rules. For example, a first rule indicates that for a transaction that is approved by an issuer, a service A has to be executed first followed by services B, C, and D in order. A second rule may indicate that for a transaction that is approved by an issuer, the service A has to be executed first followed by services C, B, and D in order. A third rule may indicate that for a transaction that is declined by an issuer, the service A has to be executed first followed by services E and D in order.

Issuer is a financial institution which establishes and maintains user accounts of several users. The issuer authorizes and settles transactions in accordance with various payment network regulations and local legislation.

Payment networks, such as those operated by Mastercard®, process transactions between acquirers and issuers. Processing by a payment network includes steps of authorization, clearing, and settlement.

Server is a physical or cloud data processing system on which a server program runs. The server may be implemented in hardware or software, or a combination thereof. In one embodiment, the server may be implemented in computer programs executing on programmable computers, such as personal computers, laptops, or a network of computer systems. The server may correspond to one of an acquirer server, a payment network server, or an issuer server.

FIG. 1 is a block diagram that illustrates an exemplary environment 100 for determining data consistency in a distributed asynchronous architecture, in accordance with an exemplary embodiment of the present disclosure. The environment 100 includes a merchant server 102, a merchant device 104, an acquirer server 106, a payment network server 108, an issuer server 110, and a user 112. The merchant server 102, the merchant device 104, the acquirer server 106, the payment network server 108, and the issuer server 110 may communicate with each other by way of a communication network 114 or through separate communication networks established between them.

The merchant server 102 is a computing server arrangement operated by a merchant. The merchant may be associated with one or more physical stores and/or online stores. In a non-limiting example, it is assumed that the merchant is associated with a physical store and that the user 112 uses a first payment mode to make a purchase of a product from the merchant at the physical store. In another embodiment, the merchant may be associated with a digital store or an electronic store. In such a scenario, the user 112 may purchase products and/or avail services from the merchant by a way of a web application or a mobile application that runs or is executed on a user device (not shown) of the user 112. Examples of the merchant server 102 may include, but are not limited to, computers, laptops, mini-computers, mainframe computers, any non-transient and tangible machines that can execute a machine-readable code, cloud-based servers, distributed server networks, a network of computer systems, or a combination thereof.

The merchant device 104 is a terminal device of the merchant such as, but not limited to, a point-of-sale device (POS), a point-of-purchase (POP) device, a point-of-interaction (POI) device, a payment gateway, or the like. The merchant device 104 may enable the user 112 to purchase products and/or services from the merchant. The merchant device 104 may communicate, to the merchant server 102, details pertaining to various transactions initiated by the use of the merchant device 104.

The acquirer server 106 is a computing server arrangement operated by a first acquirer associated with the merchant. The acquirer server 106 may maintain a first financial account of the merchant and may process transactions that are associated with the first financial account of the merchant. Examples of the acquirer server 106 may include, but are not limited to, computers, laptops, mini-computers, mainframe computers, any non-transient and tangible machines that can execute a machine-readable code, cloud-based servers, distributed server networks, a network of computer systems, or a combination thereof.

The payment network server 108 is a computing server arrangement that is operated by a payment network. The payment network is an intermediate entity between acquirers (for example, the first acquirer) and issuers (e.g., an issuer associated with the issuer server 110) for processing transactions. The payment network server 108 may be a distributed server that includes various switches (e.g., first through $N^{th}$ switches 108a-108n). Each switch of the payment network server 108 may correspond to a data center of the payment network. For example, the first switch 108a may correspond to a first data center that is located in the United States of America. The second switch 108b may correspond to a second data center that is located in India. The payment network server 108 may be based on a distributed asynchronous architecture (i.e., asynchronous payment architecture). In the distributed asynchronous architecture, processing of a transaction is divided into various smaller tasks that are independent of each other and each task may be performed by executing a dedicated service. Such services may simultaneously execute corresponding tasks for processing transactions. Various components of the payment network server 108 are explained in conjunction with FIG. 2. Examples of the payment network server 108 may include, but are not limited to, computers, laptops, mini-computers, mainframe computers, any non-transient and tangible machines that can execute a machine-readable code, cloud-based servers, distributed server networks, a network of computer systems, or a combination thereof.

The issuer server 110 is a computing server arrangement that is operated by the issuer. The issuer may be a financial institution that manages payment accounts and digital wallets of multiple users (such as the user 112). Account details of the payment accounts established with the issuer may be stored as account profiles. The issuer server 110 may credit and debit the payment accounts or the digital wallets based on purchases made by the users from their corresponding payment accounts or digital wallets. Examples of the issuer server 110 may include, but are not limited to, computers, laptops, mini-computers, mainframe computers, any non-transient and tangible machines that can execute a machine-readable code, cloud-based servers, distributed server networks, a network of computer systems, or a combination thereof.

The user 112 is an individual, who may be associated with various payment modes, for example, the first payment mode. In one example, the first payment mode of the user 112 may be a first transaction card linked to a first payment account of the user 112 that is maintained at a financial institution, such as the issuer. In another example, the first payment mode of the user 112 may be a first digital wallet maintained at the issuer. Examples of the first digital wallet may include, but are not limited to, Apple Pay Cash®, or the like. The user 112 may use the first payment mode to perform various transactions for purchasing one or more products or services from a merchant.

The communication network 114 is a medium through which content and messages are transmitted between the merchant server 102, the acquirer server 106, the payment network server 108, the issuer server 110, and other entities that are pursuant to one or more standards for the interchange of transaction requests, such as the ISO8583 standard. Examples of the communication network 114 include, but are not limited to, a Wi-Fi network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and combinations thereof. Various entities in the environment 100 may connect to the communication network 114 in accordance with various wired and wireless communication protocols, such as Transmission Control Protocol and Internet Protocol (TCP/IP), User Datagram Protocol (UDP), Long Term Evolution (LTE) communication protocols, or any combination thereof.

In operation, various transaction requests for transactions initiated at the merchant server 102 may be received by the payment network server 108 from the acquirer server 106. The transaction requests may be requests for authorization of the transactions initiated by various users (e.g., the user 112) at the merchant device 104 of the merchant. Each transaction request may be indicative of a corresponding transaction amount, corresponding payment details of a corresponding payment mode (e.g., transaction card details of a first transaction card), a merchant identifier of the merchant, or the like. Each transaction request may invoke one or more services offered by the payment network server 108 for processing the corresponding transaction. Execution of a service for each transaction may correspond to at least partial processing of the corresponding transaction. As the payment network server 108 is based on the distributed asynchronous architecture, for each transaction, multiple asynchronous services may be executed in parallel for processing the corresponding transaction. Based on the execution of such services for each transaction, various disposition messages may be generated. Each disposition message may be indicative of a unique identifier of the corresponding transaction and a timestamp indicative of a time of completion of the execution of a corresponding service.

The payment network server 108 may be configured to aggregate, for each transaction, the generated disposition messages based on the unique identifier associated with the corresponding transaction. To measure data consistency, the payment network server 108 may be configured to determine, at a first time-instant, a data consistency rate based on the aggregated disposition messages and a set of rules defined by the payment network. The first time-instant may be a current time-instant or a historical time-instant. The set of rules may define one or more standard sequences for executing the services for processing each transaction. The data consistency rate at the first time-instant may be indicative of a count of transactions, of the various transactions, that are successfully processed by the payment network server 108 as per the set of rules. In one exemplary scenario, the payment network server 108 may have received a hundred transaction requests corresponding to a hundred transactions, respectively, prior to the first time-instant and the data consistency rate at the first time-instant may be determined to be '100%'. In such a scenario, the data consistency rate indicates that the hundred transactions are successfully processed by the payment network server 108 by the first time-instant. In another exemplary scenario, the payment network server 108 may have received a hundred transaction requests corresponding to a hundred transactions, respectively, prior to the first time-instant and the data consistency rate at the first time-instant may be determined to be '80%'. In such a scenario, the data consistency rate indicates that only eighty of the hundred transactions are successfully processed by the payment network server 108 by the first time-instant. In yet another exemplary scenario, the payment network server 108 may have received a hundred transaction requests corresponding to a hundred transactions, respectively, prior to the first time-instant and the data consistency rate at the first time-instant may be determined to be '50%'. In such a scenario, the data consistency rate indicates that only fifty of the hundred transactions are successfully processed by the payment network server 108 by the first time-instant.

In one embodiment, a transaction may be processed by the payment network server 108 by using a single switch of the first through $N^{th}$ switches 108a-108n. In another embodiment, a transaction (for example, a cross-border transaction) may involve processing by more than one switch of the first through $N^{th}$ switches 108a-108n. For example, the first transaction card may be associated with the United States of America and the first transaction initiated by using the first transaction card may have originated in India. In such a scenario, the first and second switches 108a and 108b associated with the data centers of the United States of America and India, respectively, may be involved in the processing of the first transaction. For the sake of brevity, it is assumed that the first transaction is not a cross-border transaction (i.e., the first transaction is a local transaction) and is processed by a single switch (e.g., the first switch 108a).

Figure 2:
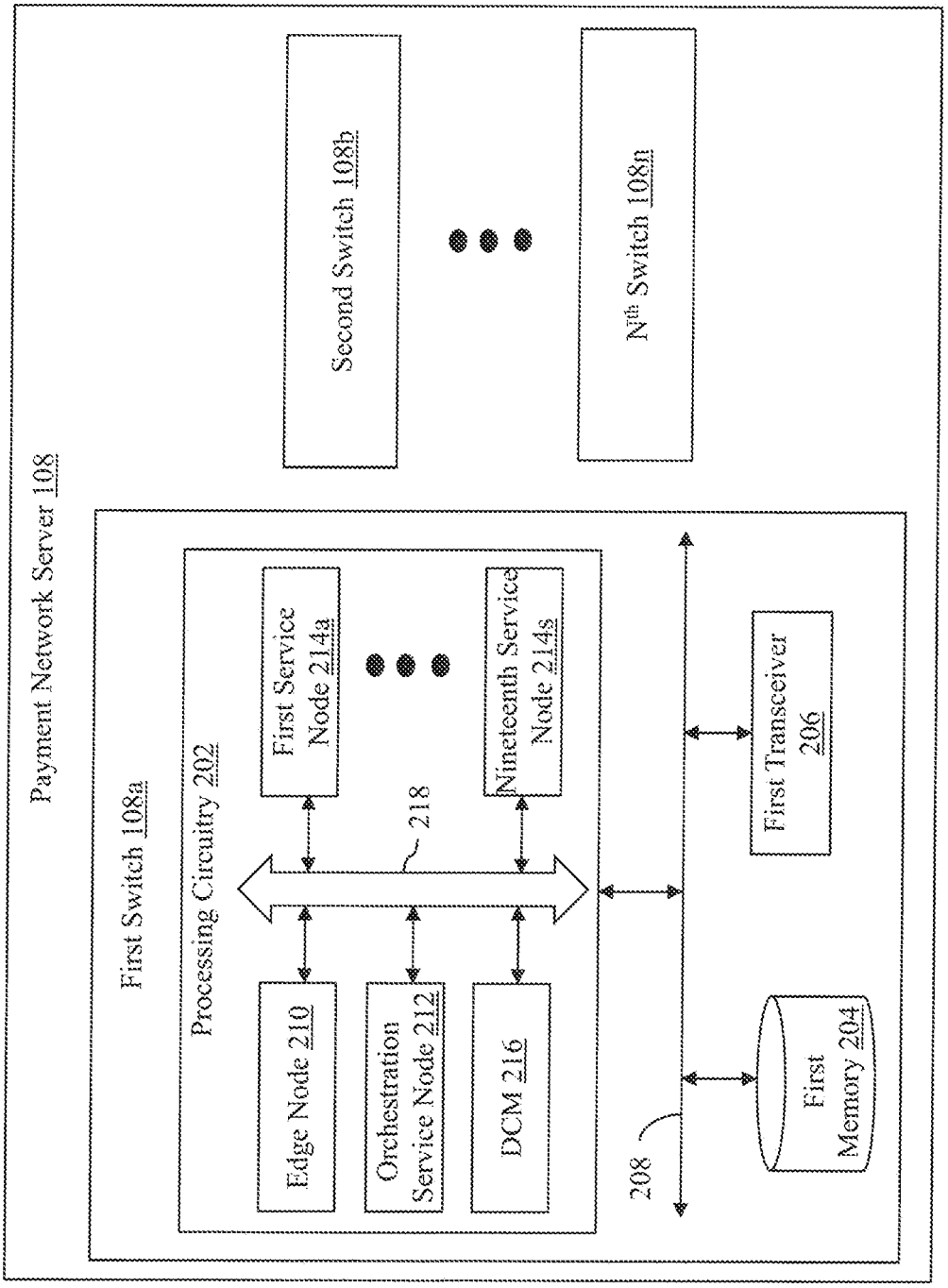
FIG. 2 is a block diagram that represents a payment network server of FIG. 1, in accordance with an exemplary embodiment of the present disclosure.

FIG. 2 is a block diagram that represents the payment network server 108, in accordance with an exemplary embodiment of the present disclosure. The first switch 108a may include processing circuitry 202, a first memory 204, and a first transceiver 206. The processing circuitry 202, the first memory 204, and the first transceiver 206 may communicate with each other by way of a first communication bus 208. It will be apparent to a person of ordinary skill in the art that the remaining switches 108b-108n may be structurally and functionally similar to the first switch 108a.

The processing circuitry 202 may include suitable logic, circuitry, interfaces, and/or code, executed by the circuitry, to process various transactions that correspond to the first switch 108a. The processing circuitry 202 may be configured to receive transaction requests from the acquirer server 106 by way of the communication network 114. The processing circuitry 202 may process the received transaction requests and may communicate each processed transaction request to a corresponding issuer. The processing circuitry 202 may include multiple service nodes such as, but not limited to, an edge node 210, an orchestration service node 212, a plurality of service nodes 214a-214s, and a data consistency monitor (DCM) 216. The edge node 210, the orchestration service node 212, the plurality of service nodes 214a-214s, and the DCM 216 may communicate with each other by way of an event bus 218. In one embodiment, each node of the processing circuitry 202 may be located at a same location. In another embodiment, one or more nodes of the processing circuitry 202 may be located at a location different from the other nodes of the processing circuitry 202. For example, the edge node 210 may be located at a location of the acquirer server 106 and the other nodes of the processing circuitry 202 may be located at a location of the first switch 108a. Structure of a node (e.g., the edge node 210, the orchestration service node 212, and the plurality of service nodes 214,) is explained in conjunction with FIG. 3A.

In one exemplary scenario, for processing the transactions, the payment network server 108 may offer nineteen services by way of the various nodes (for example, the edge node 210, the orchestration service node 212, and the plurality of service nodes 214a-214s) of the processing circuitry 202. It will be apparent to those of skill in the art that the processing circuitry 202 may include any number of nodes and may offer any number of services without deviating from the scope of the disclosure.

The edge node 210 may include suitable logic, circuitry, interfaces, and/or code, executed by the circuitry, that is configured to receive the transaction requests from the acquirer server 106. The edge node 210 may act as a bridge between the acquirer server 106 and the first switch 108a for receiving the transaction requests. For example, the edge node 210 may include various application programming interfaces (APIs) that enable the acquirer server 106 to trigger various transaction requests. The edge node 210 may be configured to store, in a database associated with the edge node 210, data indicative of the received transaction requests. For example, the edge node 210 may store, in the database, a timestamp that is indicative of a first time-instant at which a first transaction request is received, a first transaction number associated with the first transaction, a first payment account number of the first payment account, a first transaction amount of the first transaction, or the like. The edge node 210 may be configured to assign a unique identifier to each transaction request. In one example, the unique identifier of the first transaction request may be a unique transaction number of the first transaction. In another embodiment, the edge node 210 may assign a combination of two or more attributes of the first transaction request as the unique identifier. For example, the edge node 210 may assign a combination of the first payment account number and the timestamp indicative of the time-instant at which the first transaction request is received as the unique identifier to the first transaction request. For each transaction request, the edge node 210 may further communicate a transaction response to the acquirer server 106 based on a processing of a corresponding transaction. Further, the edge node 210 may generate and communicate a disposition message to the DCM 216 when the edge node 210 receives a transaction request and/or when the edge node 210 communicates a transaction response to the acquirer server 106. A disposition message may be indicative of the unique identifier of the corresponding transaction request, a timestamp indicative of a time-instant at which the corresponding transaction request is received, a timestamp indicative of a time-instant at which the corresponding transaction response is communicated to the acquirer server 106, or the like.

The orchestration service node 212 may include suitable logic, circuitry, interfaces, and/or code, executed by the circuitry, that is configured to receive, from the edge node 210, the transaction requests that are assigned with the corresponding unique identifier. The orchestration service node 212 may be configured to execute one or more services for processing the transactions associated with the transaction requests. For each received transaction request, the orchestration service node 212 may identify a set of service nodes, of the plurality of service nodes 214a-214s, which are required for processing the corresponding transaction. For each received transaction request, the orchestration service node 212 may communicate a service request to each of the identified set of service nodes to execute a corresponding service for processing the corresponding transaction. The orchestration service node 212 may further receive service fulfilment responses from the identified set of service nodes based on the communicated service requests. The orchestration service node 212 may be configured to generate and communicate a disposition message to the DCM 216 based on the execution of each of the one or more services and the reception of the service fulfilment responses from the identified set of service nodes. The disposition message generated by the orchestration service node 212 may be indicative of a result of the execution of a corresponding service for the transaction, the unique identifier of the corresponding transaction, a timestamp indicative of a time of completion of the execution of the corresponding service, or the like.

Each of the plurality of service nodes 214a-214s may include suitable logic, circuitry, interfaces, and/or code, executed by the circuitry, that is configured to receive various service requests from the orchestration service node 212 for processing various transactions. Based on the service requests received from the orchestration service node 212, each service node of the plurality of service nodes 214a-214s may be configured to execute the corresponding service for processing the transactions. Each of the plurality of service nodes 214a-214s may execute the corresponding service for performing a respective task for processing the transactions. The execution of a corresponding service by a service node of the plurality of service nodes 214a-214s for a transaction may correspond to at least partial processing of the corresponding transaction. Each of the plurality of service nodes 214a-214s may generate and communicate a service fulfilment response to the orchestration service node 212 based on the completion of the execution of the corresponding service for a transaction. Each of the plurality of service nodes 214a-214s may further generate and communicate a disposition message to the DCM 216 based on the completion of the execution of the corresponding service for the transaction. The disposition message generated by each of the plurality of service nodes 214a-214s may be indicative of a result of the execution of the corresponding service for the transaction, the unique identifier of the transaction, a timestamp indicative of a time of completion of the execution of the corresponding service, or the like.

The DCM 216 may include suitable logic, circuitry, interfaces, and/or code, executed by the circuitry, that is configured to receive the disposition messages generated by the edge node 210, the orchestration service node 212, and the plurality of service nodes 214a-214s. For example, the DCM 216 may receive a disposition message for a transaction from the edge node 210 when the edge node 210 receives a transaction request for the transaction. The DCM 216 may further receive another disposition message from a service node (for example, the orchestration service node 212 and the plurality of service nodes 214a-214s) when the service node completes executing the corresponding service for the transaction. The DCM 216 may further receive another disposition message from the edge node 210 when the edge node 210 communicates a transaction response to the acquirer server 106 indicating a complete execution of the transaction. In one embodiment, the DCM 216 may be shared among all switches 108a-108n of the payment network server 108.

The DCM 216, based on each received disposition message, may be configured to store a record in a distributed digital ledger. The distributed digital ledger may be maintained in a database associated with the DCM 216 or the first memory 204. Each record may be indicative of a corresponding disposition message. For example, a first record may be indicative of a time of completion of execution of a service by a corresponding node, a result of the execution of a corresponding service, or the like. For each transaction, the DCM 216 may be configured to aggregate received disposition messages or the stored records based on the unique identifier associated with the corresponding transaction. The DCM 216 may be configured to determine a data consistency rate of the payment network server 108 based on the aggregated disposition messages for each transaction and the set of rules defined by the payment network. The set of rules may be stored in the first memory 204. Determination of the data consistency rate is explained in detail in conjunction with FIGS. 5 and 6A-6C.

The event bus 218 may include suitable logic, circuitry, interfaces, and/or code, executable by the circuitry, that is configured to transmit and receive data using one or more communication network protocols. Each node (e.g., the edge node 210, the orchestration service node 212, and the plurality of service nodes 214a-214s) of the processing circuitry 202 may be configured to publish one or more disposition messages to the event bus 218. Each disposition message may be then communicated to the DCM 216 by the event bus 218 for aggregation. For example, the edge node 210 may publish a disposition message on receiving a transaction request from the acquirer server 106 and the orchestration service node 212 may publish another disposition message on receiving a service fulfilment response from each of the set of service nodes identified for the transaction request. The event bus 218 may comprise various queues pertaining to the nodes (i.e., the edge node 210, the orchestration service node 212, and the plurality of service nodes 214a-214s) of the processing circuitry 202. Such queues allow each of the edge node 210, the orchestration service node 212, and the plurality of service nodes 214a-214s to publish disposition messages, service requests, service fulfilment responses, or the like to the event bus 218. In a non-limiting example, the event bus 218 is a globally distributed communication bus. Therefore, the event bus 218 may allow each of the edge node 210, the orchestration service node 212, the plurality of service nodes 214a-214s, and the DCM 216 to communicate with any other node of any other switch (e.g., the second through N" switches 108b-108n). Examples of the event bus 218 may include, but are not limited to, a parallel communication interface, a high-speed communication interface, or any other communication interface configured to transmit and receive data. Detailed functionality of the event bus 218 is explained in conjunction with FIGS. 6A-6C.

The first memory 204 may include suitable logic, circuitry, interfaces, and/or code, executable by the circuitry, that is configured to store the set of rules defined by the payment network for processing the transactions. The first memory 204 may also include data and/or information required by the processing circuitry 202 to process the transactions. Examples of the first memory 204 may include a random-access memory (RAM), a read-only memory (ROM), a removable storage drive, a hard disk drive (HDD), a flash memory, a solid-state memory, and the like. It will be apparent to a person skilled in the art that the scope of the disclosure is not limited to realizing the first memory 204 in the first switch 108a of the payment network server 108, as described herein. In another embodiment, the first memory 204 may be realized in form of a database server or a cloud storage working in conjunction with the first switch 108a of the payment network server 108, without departing from the scope of the disclosure. The set of rules stored by the first memory 204 is described in detail in FIG. 4.

The first transceiver 206 may include suitable logic, circuitry, interfaces, and/or code, executable by the circuitry, for transmitting and receiving data over the communication network 114 using one or more communication network protocols. The first transceiver 206 may receive various transaction requests and transaction responses from the acquirer server 106 and the issuer server 110, respectively. The first transceiver 206 may transmit transaction requests and transaction responses to the issuer server 110 and the acquirer server 106, respectively. Examples of the first transceiver 206 may include, but are not limited to, an antenna, a radio frequency transceiver, a wireless transceiver, a Bluetooth transceiver, an ethernet port, a universal serial bus (USB) port, or any other device configured to transmit and receive data.

Figure 3B:
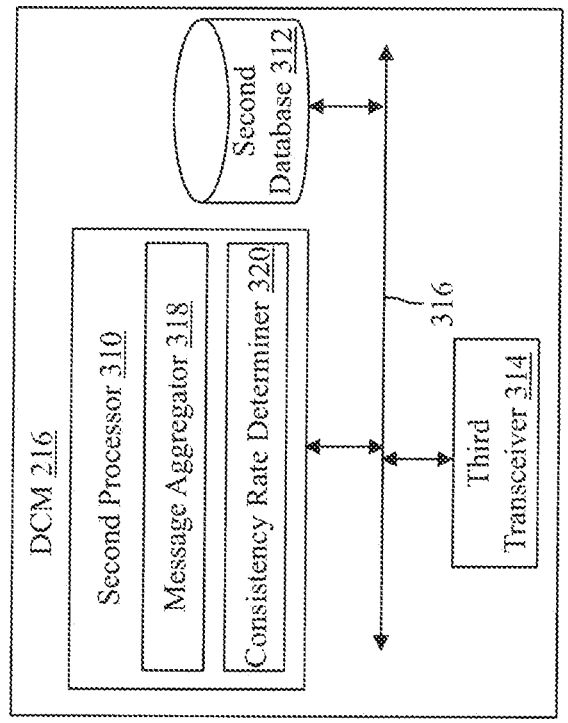
FIG. 3B is a block diagram that represents a data consistency monitor of the first switch, in accordance with an exemplary embodiment of the present disclosure.
Figure 3A:
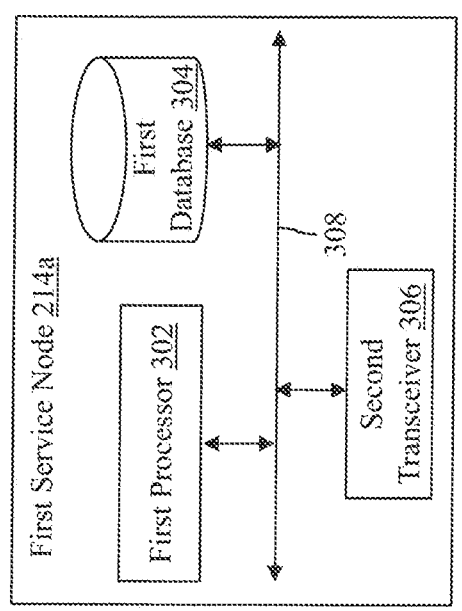
FIG. 3A is a block diagram that represents a first service node of the first switch, in accordance with an exemplary embodiment of the present disclosure.

FIG. 3A is a block diagram that represents the first service node 214a, in accordance with an exemplary embodiment of the present disclosure. The first service node 214a may include a first processor 302, a first database 304, and a second transceiver 306. The first processor 302, the first database 304, and the second transceiver 306 may communicate with each other by way of a second communication bus 308.

The first processor 302 may include suitable logic, circuitry, interfaces, and/or code, executed by the circuitry, that is configured to execute a first service for processing transactions. For example, the first processor 302 may execute the first service for a first transaction when the first processor 302 receives a first service request, generated by the orchestration service node 212, to execute the first service for processing the first transaction. The first processor 302 may further receive the first transaction request associated with the first transaction from the orchestration service node 212 by way of the event bus 218. The first processor 302 may execute the first service for processing the first transaction based on the first service request. In a non-limiting example, the first service may be a translation service for translating a transaction request to a first message format compatible with the payment network server 108. Based on the first service request, the first processor 302 may translate the first transaction request to the first message format from a second message format that may be incompatible with the payment network server 108. On translation of the first transaction request to the first message format, the first processor 302 may control the second transceiver 306 to publish a first service fulfilment response to the event bus 218 for communicating to the orchestration service node 212. The first service fulfilment response may be indicative of a result of the execution of the first service (e.g., the first transaction request in the first message format), a timestamp indicative of a time-instant at which the execution of the first service for the first transaction request was completed, or the like. The first service fulfilment response may indicate a successful execution or a failed execution of the first service. The first processor 302 may further generate a disposition message that is indicative of the completion of the first service and the timestamp indicative of the time-instant at which the execution of the first service for the first transaction request was completed. The first processor 302 may further control the second transceiver 306 to publish the generated disposition message to the event bus 218 for communicating to the DCM 216. Examples of the first processor 302 may include, but are not limited to, an application specific integrated circuit (ASIC) processor, a reduced instruction set computer (RISC) processor, a complex instruction set computer (CISC) processor, a field programmable gate array (FPGA), a combination of a central processing unit (CPU) and a graphics processing unit (GPU), a microcontroller, and/or other hardware processors.

The first database 304 may include suitable logic, circuitry, interfaces, and/or code, executable by the circuitry, that is configured to store service requests that are received and service fulfilment responses (e.g., the first service fulfilment response) and/or disposition messages (e.g., the first disposition message) published by, the first service node 214a. Examples of the first database 304 may include a RAM, a ROM, a removable storage drive, an HDD, a flash memory, a solid-state memory, a CPU cache memory, or the like. It will be apparent to a person skilled in the art that the scope of the disclosure is not limited to realizing the first database 304 in the first service node 214a, as described herein. In another embodiment, the first database 304 may be realized in form of a database server or a cloud storage working in conjunction with the first service node 214a, without departing from the scope of the disclosure.

The second transceiver 306 may include suitable logic, circuitry, interfaces, and/or code, executable by the circuitry, for transmitting data to and receiving data from the event bus 218 using one or more communication network protocols. The second transceiver 306, under the control of the first processor 302, may receive various transaction requests and service requests published to the event bus 218. The second transceiver 306 may further publish service fulfilment responses and generated disposition messages to the event bus 218 for communicating to the orchestration service node 212 and the DCM 216, respectively. The second transceiver 306 may constantly listen to the event bus 218 for receiving the respective service requests. Examples of the second transceiver 306 may include, but are not limited to, an antenna, a radio frequency transceiver, a wireless transceiver, a Bluetooth transceiver, an ethernet port, a USB port, or any other device configured to transmit and receive data.

It will be apparent to those of skill in the art that the other service nodes 214b-214s, the edge node 210, and the orchestration service node 212 may be structurally similar to the first service node 214a. In other words, each of the other service nodes 214b-214s, the edge node 210, and the orchestration service node 212 may include a processor, a database, and a transceiver for executing one or more corresponding functions for processing the transactions. It will be apparent to those of skill in the art that each of the edge node 210, the orchestration service node 212, and the plurality of service nodes 214a-214s may be modified to execute additional services without deviating from the scope of the disclosure.

FIG. 3B is a block diagram that represents the DCM 216, in accordance with an exemplary embodiment of the present disclosure. The DCM 216 may include a second processor 310, a second database 312, and a third transceiver 314. The second processor 310, the second database 312, and the third transceiver 314 may communicate with each other by way of a third communication bus 316.

The second processor 310 may include suitable logic, circuitry, interfaces, and/or code, executed by the circuitry, that is configured to determine the data consistency rate of the payment network server 108 at any time-instant.

Examples of the second processor 310 may include, but are not limited to, an ASIC processor, a RISC processor, a CISC processor, an FPGA, a combination of a CPU and a GPU, a microcontroller, and/or other hardware processors. The second processor 310 may include a message aggregator 318 and a consistency rate determiner 320.

The message aggregator 318 may be configured to store various disposition messages received from the event bus 218 as records in the second database 312. The message aggregator 318 may be further configured to aggregate the stored disposition messages for each transaction request based on the unique identifier assigned to each transaction request. The consistency rate determiner 320 may be configured to utilize the aggregated disposition messages for each transaction to determine the data consistency rate of the payment network server 108 at any time-instant, for example, a current time-instant or a historical time-instant.

The second database 312 may include suitable logic, circuitry, interfaces, and/or code, executable by the circuitry, that is configured to store the records of the disposition messages received by the DCM 216. Examples of the second database 312 may include a RAM, a ROM, a removable storage drive, an HDD, a flash memory, a solid-state memory, a CPU cache memory, or the like. It will be apparent to a person skilled in the art that the scope of the disclosure is not limited to realizing the second database 312 in the DCM 216, as described herein. In another embodiment, the second database 312 may be realized in form of a database server or a cloud storage working in conjunction with the DCM 216, without departing from the scope of the disclosure.

The third transceiver 314 may include suitable logic, circuitry, interfaces, and/or code, executable by the circuitry, for transmitting data to and receiving data from the event bus 218 using one or more communication network protocols. The third transceiver 314, under the control of the second processor 310, may receive various disposition messages published to the event bus 218. The third transceiver 314 may constantly listen to the event bus 218 for receiving the disposition messages. Examples of the third transceiver 314 may include, but are not limited to, an antenna, a radio frequency transceiver, a wireless transceiver, a Bluetooth transceiver, an ethernet port, a USB port, or any other device configured to transmit and receive data.

FIG. 4 is a Table 400 that illustrates various services offered by the payment network server 108 for processing transactions, in accordance with an exemplary embodiment of the disclosure. Table 400 is shown to include columns 402a-402d and rows 404a-404s.

The column 402a indicates names of various services offered by the payment network server 108 for processing transactions. In a non-limiting example, it is assumed that the payment network server 108 offers nineteen services for processing transactions. It will be apparent to those of skill in the art that the payment network server 108 may offer any number of services without deviating from the scope of the disclosure. Each service illustrated in the column 402a may be executed by one of the nodes of the processing circuitry 202, for example, the edge node 210, the orchestration service node 212, and the plurality of service nodes 214a-214s.

In a non-limiting example, each processed transaction may fall into one of first through third categories: 'transaction approved by the issuer', 'transaction declined by the issuer', and 'transaction approved by the payment network on behalf of the issuer' (i.e., stand-in approval), respectively, and the columns 402b-402d indicate a role of each service based on the category of a processed transaction. The column 402b indicates a role of each service when a processed transaction is of the first category, i.e., where a transaction is approved by a corresponding issuer. The column 402c indicates a role of each service when a processed transaction is of the second category, i.e., where the transaction is declined by the corresponding issuer. The column 402d indicates a role of each service when a processed transaction is of the third category, i.e., where the transaction request is authorized (i.e., the transaction is approved) by the payment network on behalf of the corresponding issuer. It will be apparent to those of skill in the art that, in other embodiments, a processed transaction may be of any category other than the first through third categories. For example, a processed transaction may belong to a fourth category where a transaction is declined by the payment network, a fifth category where the transaction is declined by the payment network on behalf of the issuer, or the like. For example, the payment network may decline the first transaction if the first transaction card, used to initiate the first transaction, is blocked by the issuer or the payment network. For the sake of brevity, Table 400 is explained in conjunction with the first transaction request. It will be apparent to those of skill in the art that same or similar services may be executed for processing other transactions.

The row 404a indicates the first service for translating the first transaction request from any other message format to the first message format (e.g., ISO8583 message format). The first service may be executed by the first service node 214a. The first service node 214a may be configured to identify a message format of the first transaction request and translate the first transaction request to the first message format if the message format of the first transaction request is incompatible with the payment network server 108. The row 404a further indicates that the first service is executed by the first service node 214a when the first transaction corresponds to any of the first through third categories.

The row 404b indicates the second service for determining routing information associated with the first transaction request. The second service may be executed by the second service node 214b. For example, the second service node 214b may determine, based on the first transaction request having the first message format, that the first transaction request is received from the acquirer server 106 and is to be routed to the issuer server 110. The row 404b further indicates that the second service may be executed by the second service node 214b when the first transaction corresponds to any of the first through third categories. The second service may be executed for the first transaction only after a completion of the execution of the first service for the first transaction. In other words, the execution of the second service by the second service node 214b is dependent on the execution of the first service by the first service node 214a.

The row 404c indicates the third service for identifying a flow type of the first transaction request. The third service may be executed by the third service node 214c. The third service node 214c may identify the flow type of the first transaction request based on the routing information determined by the second service node 214b. In other words, the execution of the third service by the third service node 214c is dependent on the execution of the second service by the second service node 214b. The row 404c further indicates that the third service is executed by the third service node 214c when the first transaction corresponds to any of the first through third categories.

The row 404d indicates the fourth service for identifying source and destination configurations of a source (e.g., the acquirer server 106) and a destination (e.g., the issuer server 110), respectively, of the first transaction request. The fourth service may be executed by the fourth service node 214*d*. The fourth service node 214*d* may retrieve the source and destination configurations based on the routing information determined by the second service node 214*b*. In other words, the execution of the fourth service by the fourth service node 214*d* is dependent on the execution of the second service by the second service node 214*b*. The row 404*d* further indicates that the fourth service is executed by the fourth service node 214*d* when the first transaction corresponds to any of the first through third categories. However, no dependencies exist between the execution of the third and fourth services. In other words, the execution of the third service is not dependent upon the execution of the fourth service. Similarly, the fourth service is not dependent upon the execution of the third service. Therefore, the third and fourth services may be executed in parallel by the third and fourth service nodes 214*c* and 214*d*, respectively.

The row 404*e* indicates the fifth service for building a services list for the first transaction. The fifth service may be executed by the fifth service node 214*e*. The services list may include a list of services (e.g., economics calculation, card validation, or the like) to be executed for processing the first transaction. The fifth service node 214*e* may build the services list for the first transaction based on the identified flow type and/or the source and destination configurations associated with the first transaction. In other words, the execution of the fifth service by the fifth service node 214*e* is dependent on the execution of the third and/or the fourth services by the third and/or fourth service nodes 214*c* and/or 214*d*, respectively. The row 404*e* further indicates that the fifth service is executed by the fifth service node 214*e* when the first transaction corresponds to any of the first through third categories.

The row 404*f* indicates the sixth service for fetching a transaction lifecycle (e.g., authorized, submitted for settlement, settling, settled, or the like) of the first transaction. The sixth service may be executed by the sixth service node 214*f*. The sixth service node 214*f* may fetch the transaction lifecycle of the first transaction based on the services list. In other words, the execution of the sixth service by the sixth service node 214*f* is dependent on the execution of the fifth service by the fifth service node 214*e*. The row 404*f* further indicates that the sixth service is executed by sixth service node 214*f* when the first transaction corresponds to any of the first through third categories.

The row 404*g* indicates the seventh service for calculating economics of the first transaction. The seventh service may be executed by the seventh service node 214*g*. For example, the calculation of the economics of the first transaction may involve determination of the first transaction amount of the first transaction. The seventh service node 214*g* may calculate the economics of the first transaction based on the services list. In other words, the execution of the seventh service by the seventh service node 214*g* is dependent on the execution of the fifth service by the fifth service node 214*e*. The row 404*g* further indicates that the seventh service is executed by the seventh service node 214*g* when the first transaction corresponds to any of the first through third categories.

The row 404*h* indicates the eighth service for validating a payment mode (for example, the first transaction card) associated with the first transaction. The eighth service may be executed by the eighth service node 214*h*. The eighth service node 214*h* may determine whether the first transaction card is valid or invalid. For example, the eighth service node 214*h* may determine whether a card verification value of the first transaction is correct. The eighth service node 214*h* may further determine whether the first transaction card has expired. The execution of the eighth service by the eighth service node 214*h* is dependent on the execution of the fifth service by the fifth service node 214*e*. The row 404*h* further indicates that the eighth service is executed by the eighth service node 214*h* when the first transaction corresponds to any of the first through third categories.

The row 404*i* indicates the ninth service for verifying a personal identification number (PIN) provided by the user 112 for initiating the first transaction. The ninth service may be executed by the ninth service node 214*i*. The PIN provided by the user 112 may be included in the first transaction request received by the edge node 210. The ninth service node 214*i* may verify the PIN by comparing the PIN included in the first transaction request with a PIN of the first transaction card stored in the first memory 204 or in a database associated with the ninth service node 214*i*. The execution of the ninth service by the ninth service node 214*i* is dependent on the reception of the first transaction request and the execution of the fifth service by the fifth service node 214*e*. The row 404*i* further indicates that the ninth service is executed by the ninth service node 214*i* when the first transaction corresponds to any of the first through third categories.

The row 404*j* indicates the tenth service for checking whether the payment mode (for example, the first transaction card) used for initiating the first transaction is blocked. The tenth service may be executed by the tenth service node 214*j*. The tenth service node 214*j* may determine whether the first transaction card is blocked by checking a first transaction card number of the first transaction card against a list of blocked transaction cards. The list of blocked transaction cards may be stored in the first memory 204 or in a database associated with the tenth service node 214*j*. The execution of the tenth service by the tenth service node 214*j* is dependent on the reception of the first transaction request and the execution of the fifth service by the fifth service node 214*e*. The row 404*j* further indicates that the tenth service is executed by the tenth service node 214*j* when the first transaction corresponds to any of the first through third categories.

The row 404*k* indicates the eleventh service for determining whether any value-added service (e.g., a loyalty points service, a reward point service, an instalment service, or the like) is applicable on the first transaction. The eleventh service may be executed by the eleventh service node 214*k*. The execution of the eleventh service by the eleventh service node 214*k* is dependent on the execution of the fifth service by the fifth service node 214*e*. The row 404*k* further indicates that the eleventh service is executed by the eleventh service node 214*k* when the first transaction corresponds to the first category. The row 404*k* further indicates that the eleventh service is partially executed by the eleventh service node 214*k* when the first transaction corresponds to one of the second or third category. The sixth through eleventh services may be executed by the sixth through eleventh service nodes 214*f*-214*k*, respectively, in parallel. Each of the sixth through eleventh services may be executed after the execution of the fifth service by the fifth service node 214*e*.

The row 404*l* indicates the twelfth service for communicating the first transaction request to the destination associated with the first transaction request (e.g., the issuer server 110) for authorization. The twelfth service may be executed by the twelfth service node 214*l*, i.e., the twelfth service node 214*l* may communicate the first transaction request to the issuer server 110 for authorization. The execution of the twelfth service by the twelfth service node 214*l* is dependent on the execution of at least one of the sixth through eleventh services. The row 404*l* further indicates that the twelfth service is executed by the twelfth service node 214*l* when the first transaction corresponds to one of the first and second categories.

The row 404*m* indicates the thirteenth service for authorization of the first transaction on behalf of the issuer. The thirteenth service may be executed by the thirteenth service node 214*m*. In a non-limiting example, the thirteenth service may be executed by the thirteenth service node 214*m* for the first transaction if the issuer server 110 is unavailable for authorization of the first transaction. The execution of the thirteenth service by the thirteenth service node 214*m* is dependent on the execution of at least one of the sixth through eleventh services. The row 404*m* further indicates that the thirteenth service is executed by the thirteenth service node 214*m* when the first transaction corresponds to the third category.

The row 404*n* indicates the fourteenth service for generating a first authorization response for approving the first transaction on behalf of the issuer. The fourteenth service may be executed by the fourteenth service node 214*n*. The fourteenth service node 214*n* may execute the fourteenth service for generating a first authorization response for the first transaction. The fourteenth service node 214*n* may execute the fourteenth service for the first transaction after the execution of the thirteenth service by the thirteenth service node 214*m*. Thus, the execution of the fourteenth service is dependent on the execution of the thirteenth service. The row 404*n* further indicates that the fourteenth service is executed by the fourteenth service node 214*n* when the first transaction corresponds to the third category. The fourteenth service may be executed on completion of the execution of the thirteenth service, i.e., the thirteenth and fourteenth services may not be executed in parallel. Further, the thirteenth and the fourteenth services may not be executed if the twelfth service is executed, i.e., if the issuer server 110 is available for authorizing the first transaction.

The row 404*o* indicates the fifteenth service for communicating an authorization response (e.g., the first authorization response or an authorization response received from the issuer server 110 for the first transaction) to the acquirer server 106. The fifteenth service may be executed by the orchestration service node 212. The execution of the fifteenth service by the orchestration service node 212 is dependent on the execution of the twelfth service or the execution of the thirteenth and fourteenth services. The row 404*o* further indicates that the fifteenth service is executed by the orchestration service node 212 when the first transaction corresponds to one of the first through third categories.

The row 404*p* indicates the sixteenth service for updating the transaction life cycle of the first transaction. The sixteenth service may be executed by the fifteenth service node 214*o*. The execution of the sixteenth service by the fifteenth service node 214*o* is dependent on the execution of the twelfth service or the execution of the thirteenth and fourteenth services. The row 404*o* further indicates that the sixteenth service is executed by the fifteenth service node 214*o* when the first transaction corresponds to one of the first through third categories.

The row 404*q* indicates the seventeenth service for updating the updating data stores of the payment network server 108. The seventeenth service may be executed by the sixteenth service node 214*p*. The execution of the seventeenth service by the sixteenth service node 214*p* is dependent on the execution of the twelfth service or the execution of the thirteenth and fourteenth services. The row 404*q* further indicates that the seventeenth service is executed by the sixteenth service node 214*p* when the first transaction corresponds to one of the first through third categories.

The row 404*r* indicates the eighteenth service for maintaining or storing reconciliation information associated with the first transaction. The eighteenth service may be executed by the seventeenth service node 214*q*. The execution of the eighteenth service by the seventeenth service node 214*q* is dependent on the execution of the twelfth service or the execution of the thirteenth and fourteenth services. The row 404*r* further indicates that the eighteenth service is executed by the seventeenth service node 214*q* when the first transaction corresponds to one of the first through third categories.

The row 404*s* indicates the nineteenth service for storing advice codes associated with the first transaction. The nineteenth service may be executed by the eighteenth service node 214*r*. The execution of the nineteenth service by the eighteenth service node 214*r* is dependent on the execution of the twelfth service or the execution of the thirteenth and fourteenth services. The row 404*s* further indicates that the nineteenth service is executed by the eighteenth service node 214*r* when the first transaction corresponds to one of the first through third categories.

The fifteenth through nineteenth services may be executed in parallel by the orchestration service node 212 and the fifteenth through eighteenth service nodes 214*o*-214*r*, respectively. Each of the fifteenth through nineteenth services may be executed on completion of the execution of the twelfth service or the completion of the execution of the thirteenth and fourteenth services. It will be apparent to a person of ordinary skill in the art that the nineteenth service node 214*s* may execute another service (not shown) offered by the payment network server 108 for processing transactions, without deviating from the scope of the disclosure.

Based on the first through nineteenth services offered by the payment network server 108, the payment network may determine various standard sequences for execution of the first through nineteenth services for successful processing of transactions. Each standard sequence may be indicative of a sequence in which the first through nineteenth services are to be executed for successfully processing a transaction. The determination of each standard sequence may be based on a fact that dependent services are to be executed one after another, while independent services may be executed in parallel, in any order. For example, the fifteenth through nineteenth services may be executed in any order as long as the twelfth service or the fourteenth service is executed prior to the execution of any of the fifteenth through nineteenth services. Similarly, the third and fourth services may be executed in any order as long as the second service is executed prior to the execution of any of the third and fourth services. For example, a first standard sequence, of the various standard sequences, may indicate that the first through nineteenth services are to be executed in a sequential order as shown in Table 400. A second standard sequence, of the various standard sequences, may be similar to the first standard sequence except that an order of execution of the third and fourth services may be interchanged in the second standard sequence. A third standard sequence, of the various standard sequences, may be similar to the first standard sequence except that an order of execution of the eighth and ninth services may be interchanged in the third standard sequence. Based on the determined various standard sequences, the payment network may define a set of rules. Each rule of the set of rules may correspond to one standard sequence of the various standard sequences. The set of rules may be stored in the first memory 204 or the second database 312 associated with the DCM 216.

Figure 5:
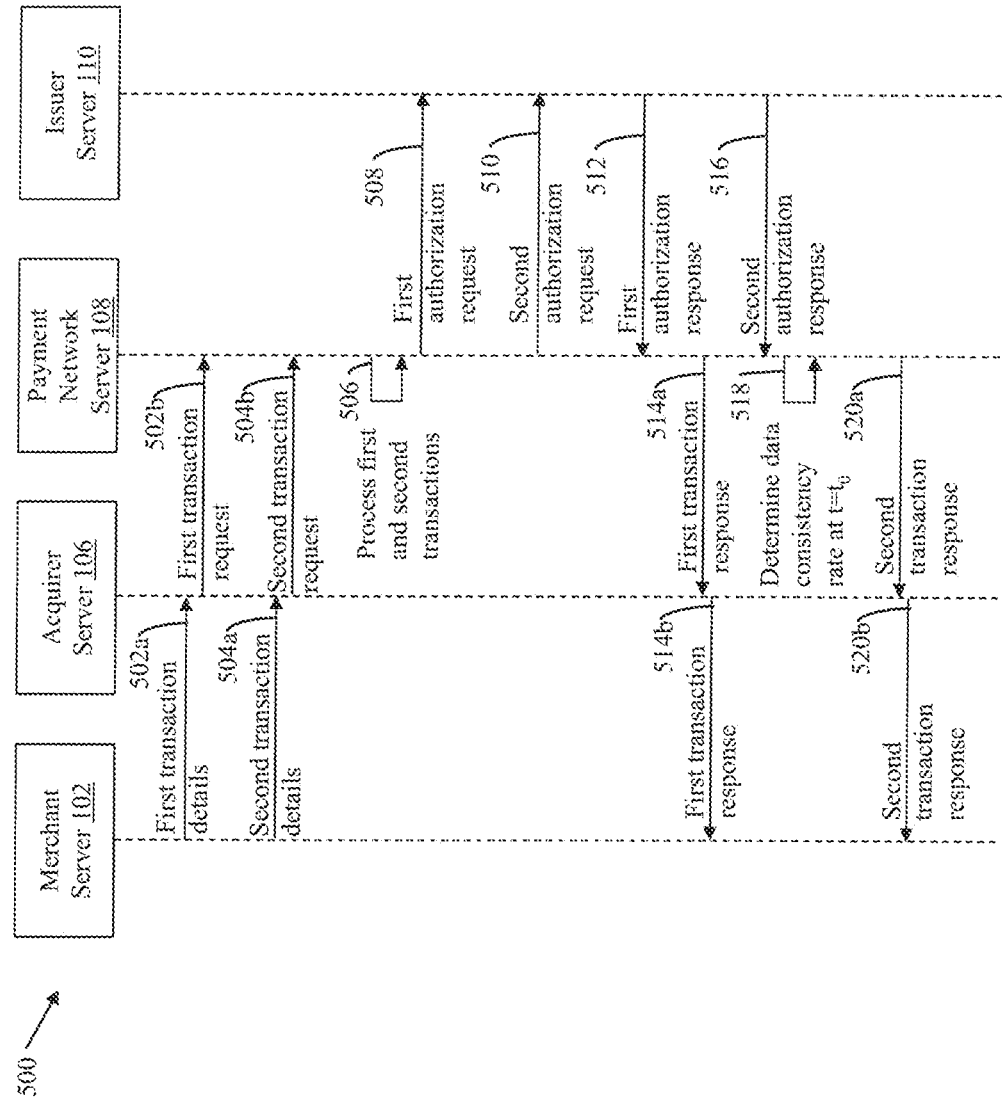
FIG. 5 represents a process flow diagram that illustrates processing of a plurality of transactions by the payment network server, in accordance with an exemplary embodiment of the present disclosure.

FIG. 5 represents a process flow diagram 500 that illustrates processing of a plurality of transactions by the payment network server 108, in accordance with an exemplary embodiment of the present disclosure. The process flow diagram 500 involves the merchant server 102, the acquirer server 106, the payment network server 108, and the issuer server 110. For the sake of brevity, the process flow diagram 500 is explained with respect to two transactions (e.g., first and second transactions); however, in actual implementation the plurality of transactions may include any number of transactions without deviating from the scope of disclosure.

The merchant server 102 may communicate first transaction details of the first transaction and second transaction details of the second transaction to the acquirer server 106 (as shown by arrows 502a and 504a). The first transaction details may be indicative of a first transaction amount of the first transaction, payment details of a payment mode used for initiating the first transaction, a merchant identifier of the merchant, or the like. The second transaction details may be indicative of a second transaction amount of the second transaction, payment details of a payment mode used for initiating the second transaction, the merchant identifier of the merchant, or the like. Based on the first and second transaction details, the acquirer server 106 may communicate the first and second transaction requests to the payment network server 108 (as shown by arrows 502b and 504b). The first and second transaction requests may include the first and second transaction details, respectively.

The payment network server 108 may receive the first and second transaction requests from the acquirer server 106. On receiving the first and second transaction requests, the payment network server 108 may process the first and second transaction requests (as shown by arrow 506). Prior to processing the first and second transactions requests, the payment network server 108 may assign first and second unique identifiers to the first and second transaction requests, respectively. The processing of the first and second transaction requests is explained in detail in FIGS. 6A-6C.

The payment network server 108 may communicate first and second authorization requests to the issuer server 110 for authorization of the first and second transactions, respectively (as shown by arrows 508 and 510). Based on the first authorization request, the issuer server 110 may communicate a first authorization response to the payment network server 108 (as shown by arrow 512). The first authorization response may indicate whether the first transaction is approved or declined by the issuer server 110. Based on the first authorization response, the payment network server 108 may communicate a first transaction response to the merchant server 102 by way of the acquirer server 106 (as shown by arrows 514a and 514b). The first transaction response may be indicative of the first authorization response. Similarly, based on the second authorization request, the issuer server 110 may communicate a second authorization response to the payment network server 108 (as shown by arrow 516). At time-instant $t=t_0$, the payment network server 108 may determine the data consistency rate of the payment network server 108 (as shown by arrow 518). The determination of the data consistency rate is explained in detail in FIGS. 6A-6C.

Based on the second authorization response, the payment network server 108 may communicate a second transaction response to the merchant server 102 by way of the acquirer server 106 (as shown by arrows 520a and 520b). The second transaction response may be indicative of the second authorization response.

Figure 6A:
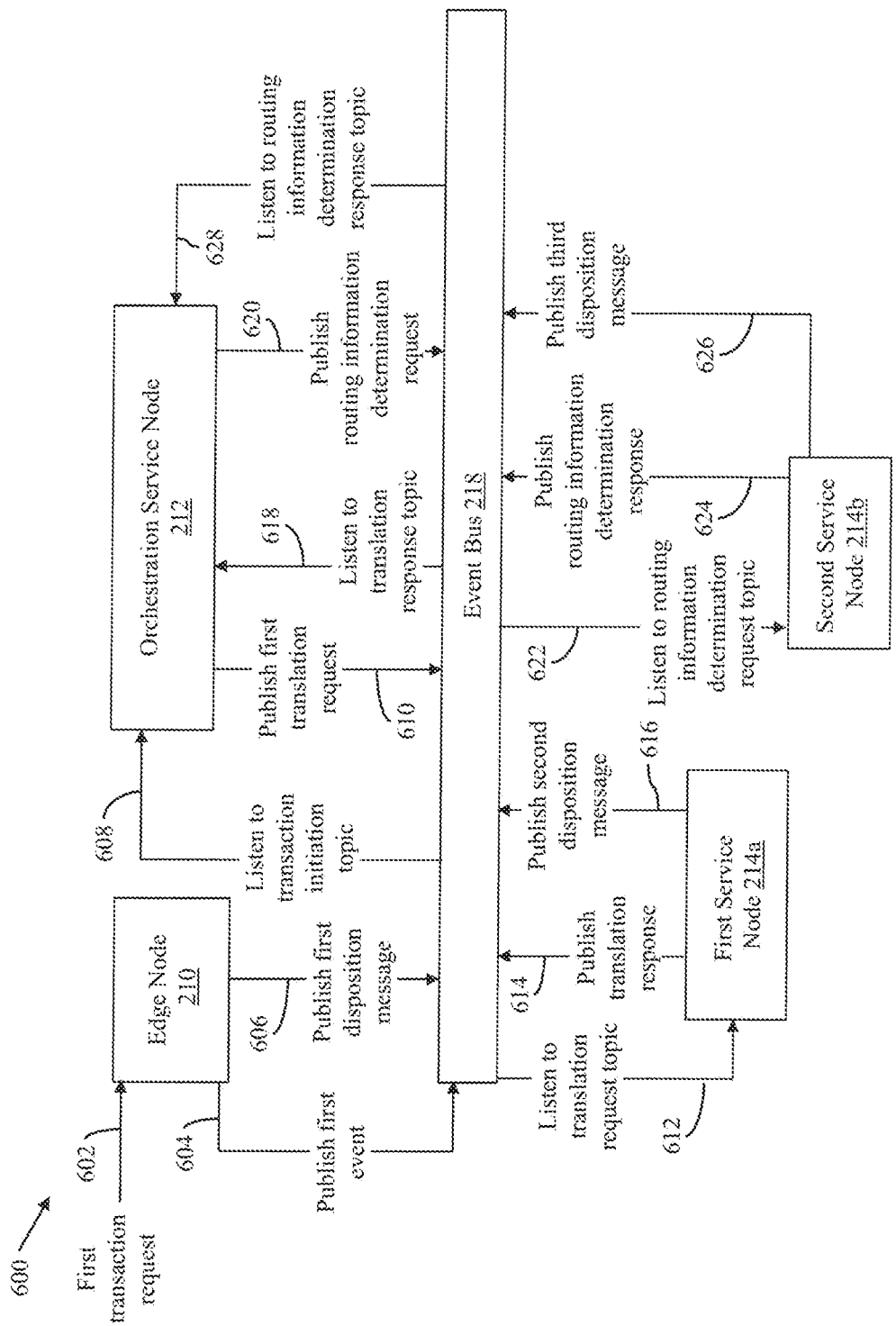
FIGS. 6A-6C, collectively represent a process flow diagram that illustrates processing of a transaction by the payment network server, in accordance with an exemplary embodiment of the present disclosure.
Figure 6B:
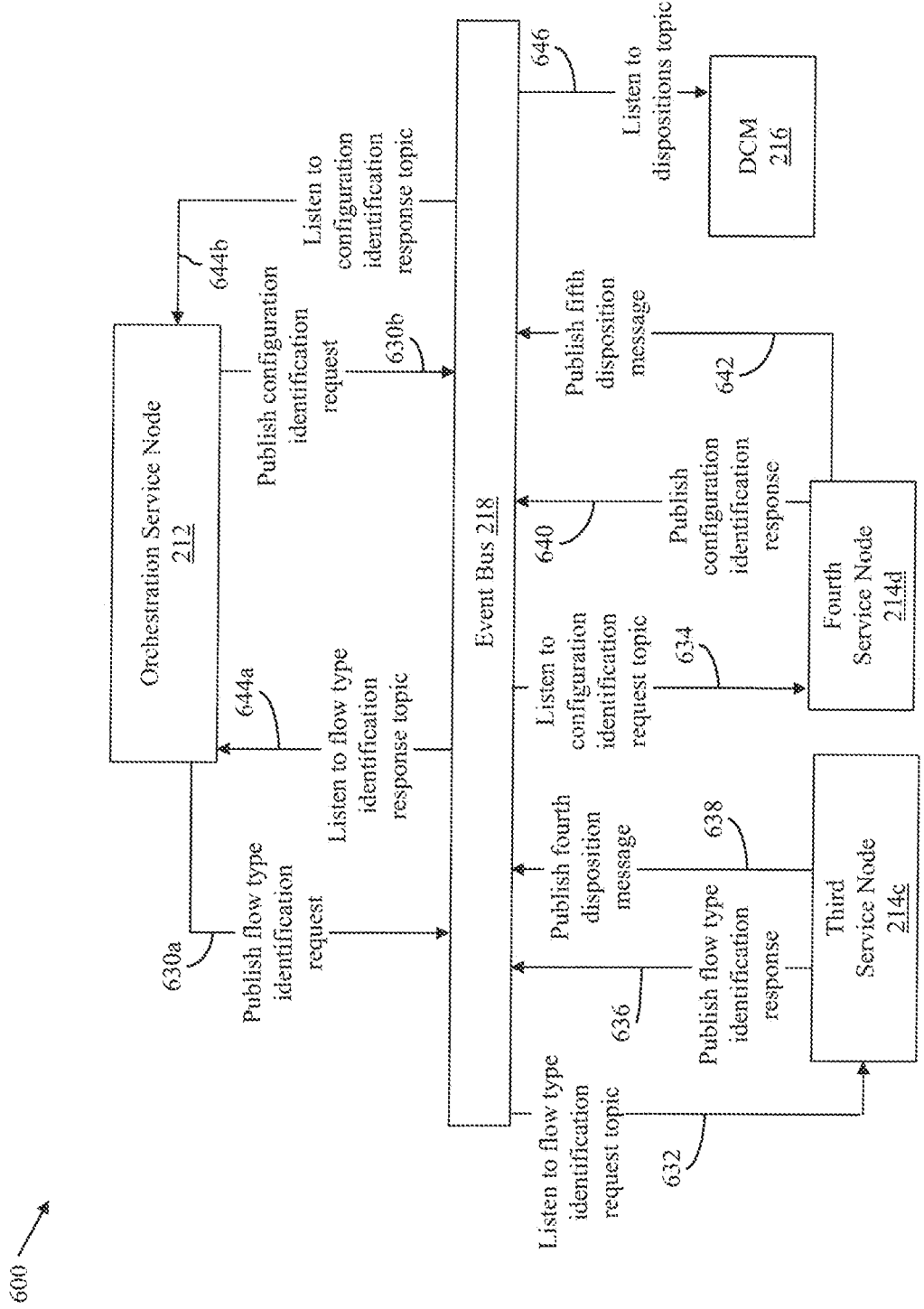
Figure 6C:
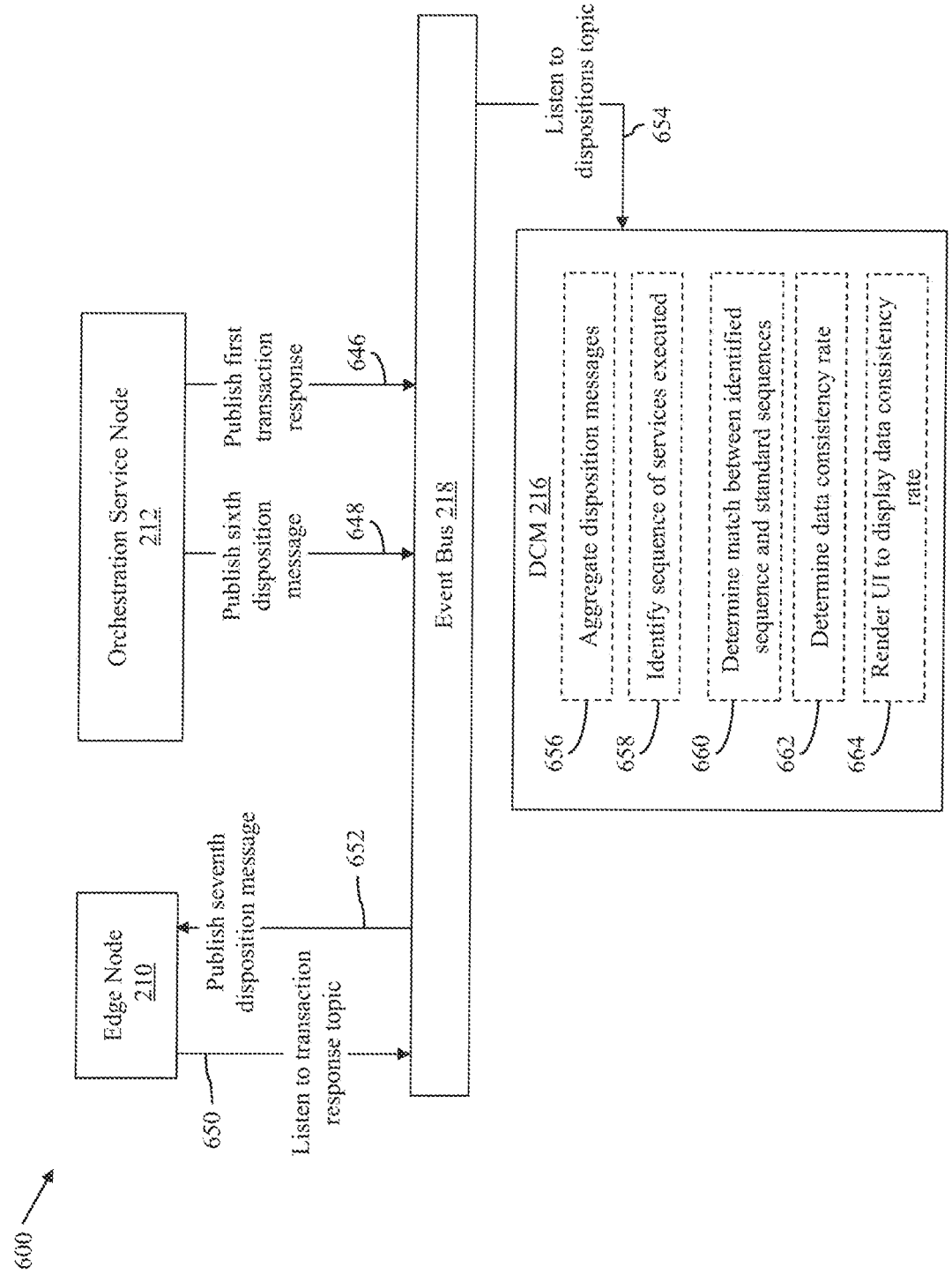

FIGS. 6A-6C, collectively represent a process flow diagram 600 that illustrates processing of a transaction by the payment network server 108, in accordance with an exemplary embodiment of the present disclosure. The process flow diagram 600 involves the edge node 210, the orchestration service node 212, the first through fourth service nodes 214a-214d, the DCM 216, and the event bus 218. FIGS. 6A-6C illustrate the processing of the first transaction (as shown by arrow 506 in FIG. 5). It will be apparent to those of skill in the art that other transactions (for example, the second transaction) may be processed by the first switch 108a of the payment network server 108 in a manner similar to the processing of the first transaction.

With reference to FIG. 6A, the edge node 210 may receive the first transaction request for the first transaction from the acquirer server 106 (as shown by arrow 602). The edge node 210 may be configured to assign the first unique identifier to the first transaction request. The edge node 210 may store, in the database associated with the edge node 210, first data indicative of the reception of the first transaction request. For example, the first data may include the first unique identifier assigned to the first transaction request, the first transaction number, the timestamp indicative of the time-instant at which the first transaction request is received, or the like. The edge node 210 may publish a first event to the event bus 218 for communicating to the orchestration service node 212 (as shown by arrow 604). The first event may be indicative of the reception of the first transaction request and may include the first transaction request. The edge node 210 may further generate and publish a first disposition message, indicative of the first data, to the event bus 218 (as shown by arrow 606).

Events (such as the first event) and/or disposition messages (such as the first disposition message) may be published to various queues included in the event bus 218. Each queue in the event bus 218 may be associated with a topic that corresponds to a service offered by the payment network server 108. With reference to the services illustrated in Table 400 of FIG. 4, the topics may include, but are not limited to, a transaction initiation topic, a transaction response topic, a translation request topic, a translation response topic, a blocking check request topic, a blocking check response topic, a dispositions topic, or the like. When a service is to be requested for processing a transaction, a service request may be published to a queue that is associated with the topic of the required service. For example, service requests for the execution of the first service (i.e., translation of transaction requests) are published to the queue associated with the translation request topic. Thus, the edge node 210 may publish the first event to the queue associated with the transaction initiation topic and the first disposition message to the queue associated with the dispositions topic. After publishing the first event and the first disposition message to the event bus 218, the edge node 210 may start processing the received second transaction request.

Each of the orchestration service node 212, the plurality of service nodes 214a-214s, and the DCM 216 may subscribe to one or more topics. A node (e.g., the orchestration service node 212, the plurality of service nodes 214a-214s, and the DCM 216) that has subscribed to a topic may receive messages, requests, responses, and/or events published in a queue associated with the subscribed topic. In other words, a node may listen to each topic to which the node has subscribed. The node may ignore messages, requests, responses, and/or events published in queues associated with other topics that the node has not subscribed. For example, the orchestration service node 212 may have subscribed to the transaction initiation topic and, thus, the orchestration service node 212 may listen to the transaction initiation topic (as shown by arrow 608). Since the orchestration service node 212 constantly listens to the transaction initiation topic, the orchestration service node 212 may receive the first event published by the edge node 210 to the queue associated with the transaction initiation topic.

The orchestration service node 212 may determine that the message format of the first transaction request is incompatible with the first message format supported by the payment network server 108. Thus, the orchestration service node 212 may determine that the first service is required for translating the first transaction request to the first message format. The orchestration service node 212 may then publish a translation request to the queue associated with the translation request topic (as shown by arrow 610). In one embodiment, the orchestration service node 212 may set a timer for receiving a response when the orchestration service node 212 publishes the translation request. If the timer expires before the orchestration service node 212 receives the response for the translation request, the orchestration service node 212 may generate a time-out error message and decline the first transaction request. Decline of a transaction due to timing-out of the timer may correspond to another category in which a successfully transaction may fall into. For the sake of brevity, the processing of the first transaction is explained with respect to one of the first through third categories described in FIG. 4.

After publishing the translation request to the event bus 218, the orchestration service node 212 may be configured to process another event or request published to the queue of one of the topics subscribed by the orchestration service node 212. For example, the orchestration service node 212 may be configured to process a second event that is published to the queue of the transaction initiation topic by the edge node 210, for the second transaction request.

The first service node 214a that executes the first service may have subscribed to the translation request topic and may constantly listen to the translation request topic (as shown by arrow 612). The first service node 214a may be configured to execute the first service for all the requests that are queued in the queue associated with the translation request topic in a sequential order, for example, first-in-first-out (FIFO) order. Since the first service node 214a constantly listens to the translation request topic, the first service node 214a may receive the translation request published to the queue associated with the translation request topic. The first service node 214a then executes the first service for translating the first transaction request to the first message format supported by the payment network server 108. For example, the first service node 214a translates the first transaction request from a second message format to the first message format. On translating the first transaction request to the first message format, the first service node 214a may publish a translation response (i.e., a service fulfilment response), indicative of the translated first transaction request, to the queue associated with the translation response topic (as shown by arrow 614). The first service node 214a may further generate and publish a second disposition message on the queue associated with the dispositions topic (as shown by arrow 616). The second disposition message may be indicative of a result of the execution of the first service (e.g., translation success or translation failed), a timestamp indicative of a time-instant at which the translation of the first transaction request was completed, the first unique identifier, or the like. After publishing the translation response and the second disposition message to the event bus 218, the first service node 214a may receive another translation request published to the queue of the translation request topic subscribed by the first service node 214a.

The orchestration service node 212 may have further subscribed to the translation response topic and may constantly listen to the translation response topic (as shown by arrow 618). Since the orchestration service node 212 constantly listens to the translation response topic, the orchestration service node 212 receives the translation response from the queue associated with the translation response topic. In other words, the first service node 214a may communicate the first transaction request that is translated to the first message format to the orchestration service node 212 by way of the event bus 218. Based on the received translation response, the orchestration service node 212 may generate a routing information determination request to determine the routing information for the first transaction request. The routing information determination request may include the translated first transaction request. The orchestration service node 212 may publish the routing information determination request to the queue associated with the routing information determination request topic (as shown by arrow 620). After publishing the routing information determination request to the event bus 218, the orchestration service node 212 may receive another event or request published to the queue of one of the topics subscribed by the orchestration service node 212 for processing.

The second service node 214b may have subscribed to the routing information determination request topic and may constantly listen to the routing information determination request topic (as shown by arrow 622). The second service node 214b may be configured to execute the second service for all the requests that are queued in the queue associated with the routing information determination request topic in a sequential order, for example, FIFO order. Since the second service node 214b constantly listens to the routing information determination request topic, the second service node 214b may receive the routing information determination request published to the queue associated with the routing information determination request topic. The second service node 214b may execute the second service to determine the routing information associated with the translated first transaction request (as described in FIG. 4). On determining the routing information associated with the translated first transaction request, the second service node 214b may publish a routing information determination response, indicative of the determined routing information, to a queue associated with the routing information determination response topic (as shown by arrow 624). The second service node 214b may generate and publish a third disposition message on the queue associated with the dispositions topic (as shown by arrow 626). The third disposition message may be indicative of a result of the execution of the second service (e.g., routing information determination successful or routing information determination failed), a timestamp indicative of a time-instant at which the routing information was determined, the first unique identifier, or the like.

The orchestration service node 212 may have further subscribed to the routing information determination response topic and may constantly listen to the routing information determination response topic (as shown by arrow 628). Since the orchestration service node 212 constantly listens to the routing information determination response topic, the orchestration service node 212 may then receive the routing information determination response from the corresponding queue. As described in the foregoing description of FIG. 4, the first and second services are dependent on each other. Therefore, the routing information determination request is communicated to the second service node 214b after the completion of the first service by the first service node 214a.

With reference to FIG. 6B, based on the received routing information determination response, the orchestration service node 212 may publish a flow type identification request to the queue associated with the flow type identification request topic (as shown by arrow 630a). The flow type identification request may include the determined routing information. The orchestration service node 212 may further publish a configuration identification request to the queue associated with the configuration identification request topic (as shown by arrow 630b). The configuration identification request may include the determined routing information. After publishing the configuration identification request to the event bus 218, the orchestration service node 212 may receive another event or request published to the queue of one of the topics subscribed by the orchestration service node 212.

The third and fourth service nodes 214c and 214d may have subscribed to the flow type identification request topic and the configuration identification request topic, respectively, and may constantly listen to the flow type identification request topic and the configuration identification request topic, respectively (as shown by arrows 632 and 634). Since the third and fourth services are independent of each other, the third and fourth service nodes 214c and 214d may execute the respective third and fourth services in parallel.

The third service node 214c may be configured to execute the third service for all the requests that are queued in the queue associated with the flow type identification request topic in a sequential order, for example, FIFO order. Since the third service node 214c constantly listens to the flow type identification request topic, the third service node 214c may receive the flow type identification request published to the queue associated with the flow type identification request topic. The third service node 214c may execute the third service to determine the flow type of the first transaction request (as described in FIG. 4). On identifying the flow type of the first transaction request, the third service node 214c may publish a flow type identification response, indicative of the identified flow type of the first transaction request, to a queue associated with a flow type identification response topic (as shown by arrow 636). The third service node 214c may further generate and publish a fourth disposition message to the queue associated with the dispositions topic (as shown by arrow 638). The fourth disposition message may be indicative of a result of the execution of the fourth service (e.g., flow type identification successful or flow type identification determination failed), a timestamp indicative of a time-instant at which the flow type was identified, the first unique identifier, or the like.

The fourth service node 214d may be configured to execute the fourth service for all the requests that are queued in the queue associated with the configuration identification request topic in a sequential order, for example, FIFO order. Since the fourth service node 214d constantly listens to the configuration identification request topic, the fourth service node 214d may receive the configuration identification request published to the queue associated with the configuration identification request topic. The fourth service node 214d may execute the fourth service to identify the configurations of the source and destination associated with the first transaction request (as described in FIG. 4). On identifying the configurations of the source and destination, the fourth service node 214d may publish a configuration identification response, indicative of the identified configurations, to a queue associated with a configuration identification response topic (as shown by arrow 640). The fourth service node 214d may further generate and publish a fifth disposition message to the queue associated with the dispositions topic (as shown by arrow 642). The fifth disposition message may be indicative of a result of the execution of the fourth service (e.g., configuration identification successful or configuration identification determination failed), a timestamp indicative of a time-instant at which the configurations were identified, the first unique identifier, or the like.

The orchestration service node 212 may have subscribed to the flow type identification response topic and the configuration identification response topic, and may constantly listen to the flow type identification response topic and the configuration identification response topic (as shown by arrows 644a and 644b). Since the orchestration service node 212 constantly listens to the flow type identification response topic and the configuration identification response topic, the orchestration service node 212 may then receive the flow type identification response and the configuration identification response.

Similarly, the orchestration service node 212 may communicate service requests to the remaining service nodes 214e-214s for executing other required services for the first transaction. The orchestration service node 212 may receive service fulfilment responses from the remaining service nodes 214e-214s. In a non-limiting example, it is assumed that the issuer server 110 is available for authorizing the first transaction. Therefore, the orchestration service node 212 may receive the first authorization response from the issuer server 110.

With reference to FIG. 6C, the orchestration service node 212 may aggregate all the responses received from the plurality of service nodes 214a-214s and publish the first transaction response, indicative of the first authorization response, to a queue associated with a transaction response topic (as shown by arrow 646). The orchestration service node 212 may further generate a sixth disposition message that is indicative of a successful processing of the first transaction. The orchestration service node 212 may publish the sixth disposition message to the queue associated with the dispositions topic (as shown by arrow 648). The sixth disposition message may be indicative of the successful processing of the first transaction, a timestamp indicative of a time-instant at which the all the responses are aggregated, the first unique identifier, or the like.

The edge node 210 may have subscribed to the transaction response topic and may constantly listen to the transaction response topic (as shown by arrow 650). The edge node 210 may be configured to communicate all the transaction responses that are queued in the queue associated with the transaction response topic in a sequential order (for example, FIFO order) to the corresponding acquirers (for example, the acquirer server 106). Since the edge node 210 constantly listens to the transaction response topic, the edge node 210 may receive the first transaction response published to the queue associated with the transaction response topic. The edge node 210 may communicate the first transaction response to the acquirer server 106 (as shown by arrow 514a in FIG. 5). The edge node 210 may generate and publish a seventh disposition message to the queue associated with the dispositions topic (as shown by arrow 652). The seventh disposition message may indicate that the first transaction response for the first transaction is successfully communicated to the acquirer server 106, a timestamp indicative of a time-instant at which the first transaction response was communicated to the acquirer server 106, the first unique identifier, or the like.

The DCM 216 may have subscribed to the dispositions topic and may constantly listen to the dispositions topic (as shown by arrow 654). Since the DCM 216 constantly listens to the dispositions topic, the DCM 216 may receive all the disposition messages that are published to the queue associated with the dispositions topic. Based on each disposition message (e.g., the first through seventh disposition messages) that is published to the queue associated with the dispositions topic, the DCM 216 may store a record in a distributed digital ledger stored in the second database 312 of the DCM 216. Each record may be indicative of a corresponding disposition message.

The DCM 216 may be configured to aggregate the disposition messages (e.g., the first through seventh disposition messages) published by the edge node 210, the orchestration service node 212, and the plurality of service nodes 214a-214s for the first transaction (as shown by dotted box 656). The DCM 216 may aggregate the disposition messages for the first transaction by using the first unique identifier assigned to the first transaction request. For example, there may exist a hundred disposition messages in the queue associated with the dispositions topic and from the hundred disposition messages eighteen disposition messages may have the first unique identifier assigned to the first transaction request. Thus, the DCM 216 may identify that the eighteen disposition messages having the first unique identifier assigned to the first transaction request correspond to the first transaction.

Based on the time-instants indicated by the aggregated disposition messages, the DCM 216 may identify a sequence of services executed by the nodes of the first switch 108a for processing the first transaction (as shown by dotted box 658). The DCM 216 may determine whether the identified sequence of services for the first transaction matches one of the standard sequences defined by the set of rules (as shown by dotted box 660). In one example, the identified sequence of services for the first transaction may match the first standard sequence defined by a first rule of the set of rules. The first standard sequence may indicate that the first through nineteenth services are to be executed in a sequential order as shown in Table 400. In another example, the identified sequence of services for the first transaction may match the second standard sequence defined by a second rule of the set of rules. The second standard sequence may be similar to the first standard sequence except that an order of execution of the third and fourth services may be interchanged in the second standard sequence. If the DCM 216 determines that the identified sequence is same as one of the standard sequences, the first transaction is said to be successfully processed by the payment network server 108. Therefore, for various transaction requests received by the payment network server 108, the DCM 216 may determine whether each transaction is successfully processed according to the set of rules. Based on the determination, the DCM 216 may determine the data consistency rate of the payment network server 108 at a first time-instant (as shown by dotted box 662). The first time-instant may be a current time-instant or a historical time-instant.

For determining the data consistency rate at the first time-instant (e.g., the current time-instant), the DCM 216 may identify all transaction requests that were received by the first time-instant. Consequently, the DCM 216 may identify a sequence of execution of services for each of the identified transactions based on the aggregated disposition messages corresponding to each transaction request. Based on the identified sequences and the set of rules, the DCM 216 may determine the data consistency rate that is indicative of a count of transactions that are successfully processed by the first time-instant. For example, the DCM 216 may determine that the data consistency rate at the current time-instant is '100%'. This indicates that '100%' of the transactions received by the current time-instant are successfully processed. '100%' data consistency rate may indicate that all the transactions that were processed by the payment network server 108 by the current time-instant are referenced in the database of each node (e.g., the edge node 210, the orchestration service node 212, or the plurality of service nodes 214a-214s) that was required for processing of the corresponding transaction. Thus, if the DCM 216 determines that the data consistency rate at the time-instant $t=t_0$ is '100%', it may indicate that both the first and second transactions are successfully processed. In another example, the DCM 216 may determine that the data consistency rate at the first time-instant is '50%'. This indicates that only '50%' of the transactions received are successfully processed by the first time-instant. Thus, if the DCM 216 determines that the data consistency rate at the time-instant $t=t_0$ is '50%', it may indicate that only one of the first and second transactions is successfully processed. The DCM 216 may further render a first user interface (UI) on a first display associated with the payment network server 108 (as shown by dotted box 664). The first UI may present the data consistency rate at the first time-instant.

In one embodiment, the DCM 216 may incorporate artificial intelligence (e.g., machine learning, deep learning, or the like) by way of one or more plugins, enabling the DCM 216 to learn various sequence patterns in which the services are executed by the nodes (e.g., the edge node 210, the orchestration service node 212, and the plurality of service nodes 214a-214s) of the first switch 108a for processing transactions corresponding to the received transaction requests. The DCM 216 may be configured to learn the sequence patterns based on the aggregation of disposition messages for each received transaction request. In one exemplary scenario, the DCM 216 may learn a first sequence pattern according to which transactions that are approved by the issuer server 110 are typically executed based on the first or second standard sequence. In other words, as per the learned first sequence pattern, the first through twelfth services and fifteenth through nineteenth services (as shown in Table 400) are typically executed according to the first or second standard sequence for the transactions that are approved by the issuer server 110.

Based on the learned sequence patterns, the determined data consistency rate, or the aggregated disposition messages, the DCM 216 may be configured to identify if any of the edge node 210, the orchestration service node 212, and the plurality of service nodes 214a-214s, are experiencing a lag or are under high load. A node (e.g., the edge node 210, the orchestration service node 212, and the plurality of service nodes 214a-214s) may experience a lag or a high load if a queue associated with a topic subscribed by the corresponding node is overloaded. In one exemplary scenario, the DCM 216 may determine that the sequence of execution of the first through twelfth services and fifteenth through nineteenth services, for a new set of transactions that is approved by the issuer server 110, deviates from the learned sequence pattern. For example, the DCM 216 may determine that, of the sixth through eleventh services, the sixth service is the last to be executed, which contradicts the first and second standard sequences. Thus, the DCM 216 may then identify that the sixth service node 214f may be experiencing lag or is under high load. In other words, the DCM 216 may indicate that a queue associated with a topic, to which the sixth service node 214f has subscribed, may be overloaded. In such a scenario, the DCM 216 may generate a notification to indicate that the sequence of execution of the first through twelfth services and fifteenth through nineteenth services for the new set of transactions has deviated from the learned sequence patterns (e.g., the first sequence pattern). The notification may further include the details of the sixth service node 214f that is experiencing lag. The DCM 216 may present the generated notification on the first UI. The DCM 216 may further present one or more other notifications, indicative of the other service nodes that are experiencing lag or high stress, on the first UI.

In another embodiment, the identified sequence of services for the first transaction may not match any of the standard sequences defined by the set of rules. For example, based on the aggregation of disposition messages, the DCM 216 may determine that disposition messages are received from all nodes except one service node. In such a scenario, the DCM 216 may identify that the service node, from which the DCM 216 has not received any disposition message is lagging. This may occur if a queue associated with a disposition topic associated with the service node is overloaded.

It will be apparent to a person of ordinary skill in the art that the scope of the disclosure is not limited to determination of data consistency rates by the payment network server 108. In one embodiment, the acquirer server 106, the issuer server 110, or any third-party server (not shown) may be a distributed network system that is based on an asynchronous architecture. In such a scenario, the acquirer server 106, the issuer server 110, and/or the third-party server may determine corresponding data consistency rates at any time instant in a similar manner as described for the payment network server 108, i.e., by utilizing the DCM 216 and generation of disposition messages.

Figure 7:
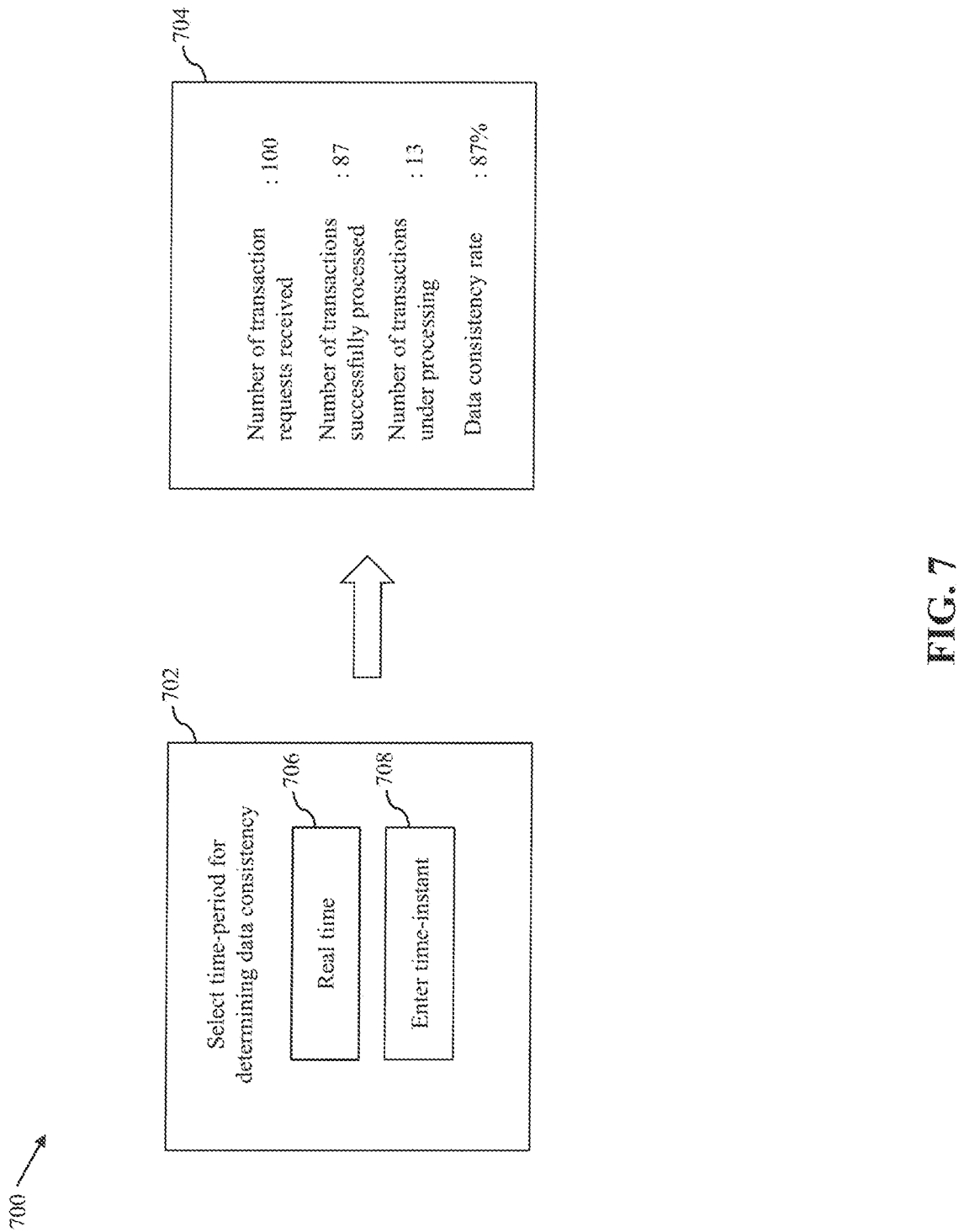
FIG. 7 is a block diagram that represents an exemplary scenario for illustrating UI screens rendered by the data consistency monitor, in accordance with an exemplary embodiment of the present disclosure.

FIG. 7 is a block diagram that represents an exemplary scenario 700 for illustrating UI screens 702 and 704 rendered by the DCM 216, in accordance with an exemplary embodiment of the present disclosure. The first and second UI screens 702 and 704 may be rendered on the first display associated with the payment network server 108. In a non-limiting example, the first display may be a display of a computing-device associated with the payment network server 108. FIG. 7 has been explained in conjunction with FIGS. 5 and 6A-6C.

When a payment network operator (not shown) accesses the computing-device associated with the payment network server 108, the DCM 216 may render the first UI screen 702 on the first display. The first UI screen 702 may include first and second user-selectable options 706 and 708, respectively. The first user-selectable option 706 may allow the payment network operator to view data consistency rate of the payment network server 108 in real time. The second user-selectable option 708 may allow the payment network operator to provide any historical time-instant for viewing data consistency rate of the payment network server 108 at the historical time-instant. In a non-limiting example, it is assumed that the payment network operator may select the first user-selectable option 706. When the payment network operator selects the first user-selectable option 706, the DCM 216 may determine a data consistency rate at a current time-instant and the DCM 216 may render the second UI screen 704 on the first display. The second UI screen 704 presents a number of transactions received (i.e., '100'), a number of transactions successfully processed (i.e., '87'), a number of transactions that were received before the current time-instant and are being processed (i.e., '13'), and the data consistency rate at the current time-instant (i.e., '87%'). It will be apparent to those of skill in the art that the first and second UI screens 702 and 704 are merely exemplary. The DCM 216 may render UI screens to present other information (e.g., service nodes experiencing lag or stress) without deviating from the scope of the disclosure.

Figure 8A:
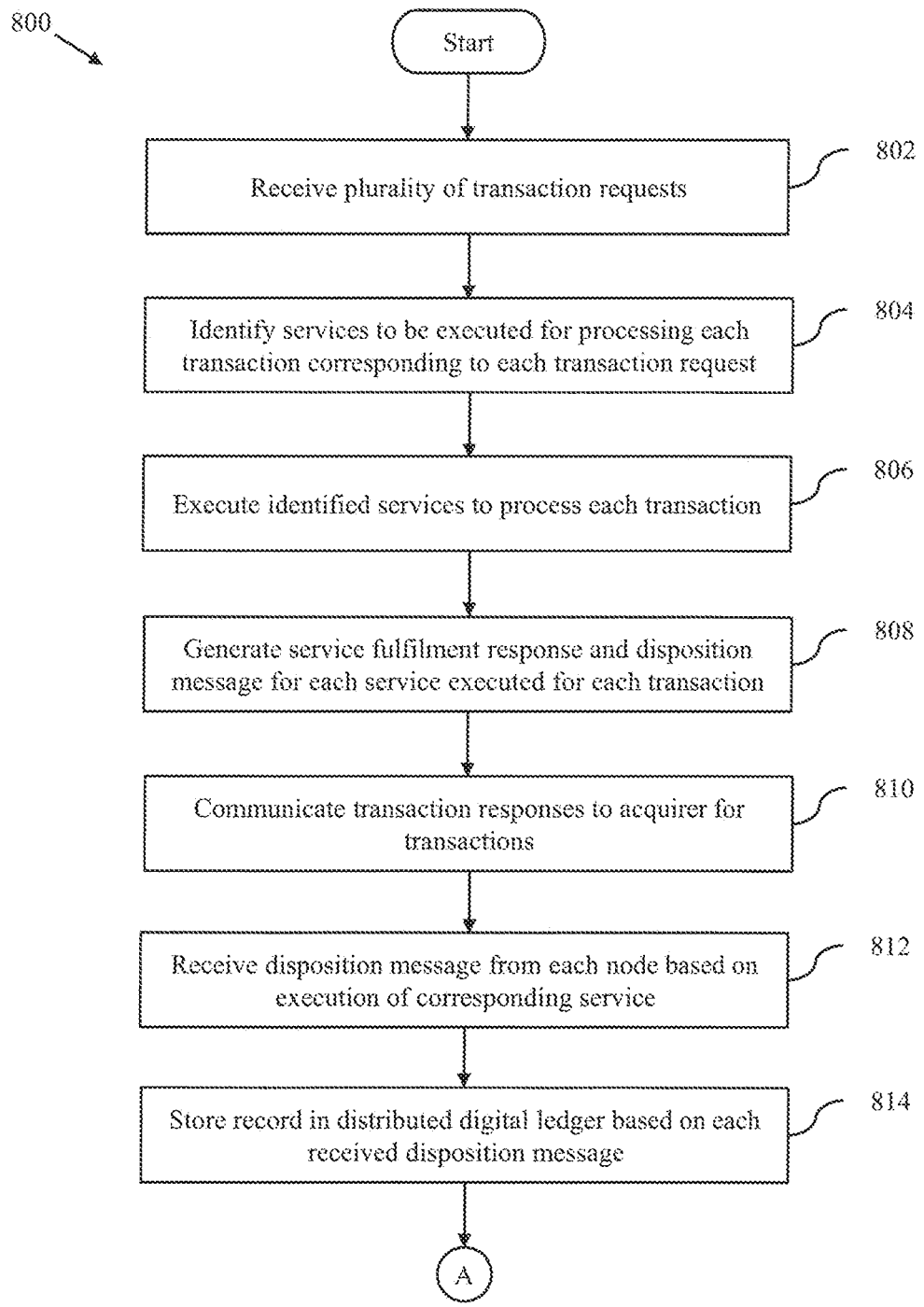
FIGS. 8A and 8B, collectively represent a flow chart that illustrates a method for determining data consistency in a distributed asynchronous architecture, in accordance with an embodiment of the present disclosure.
Figure 8B:
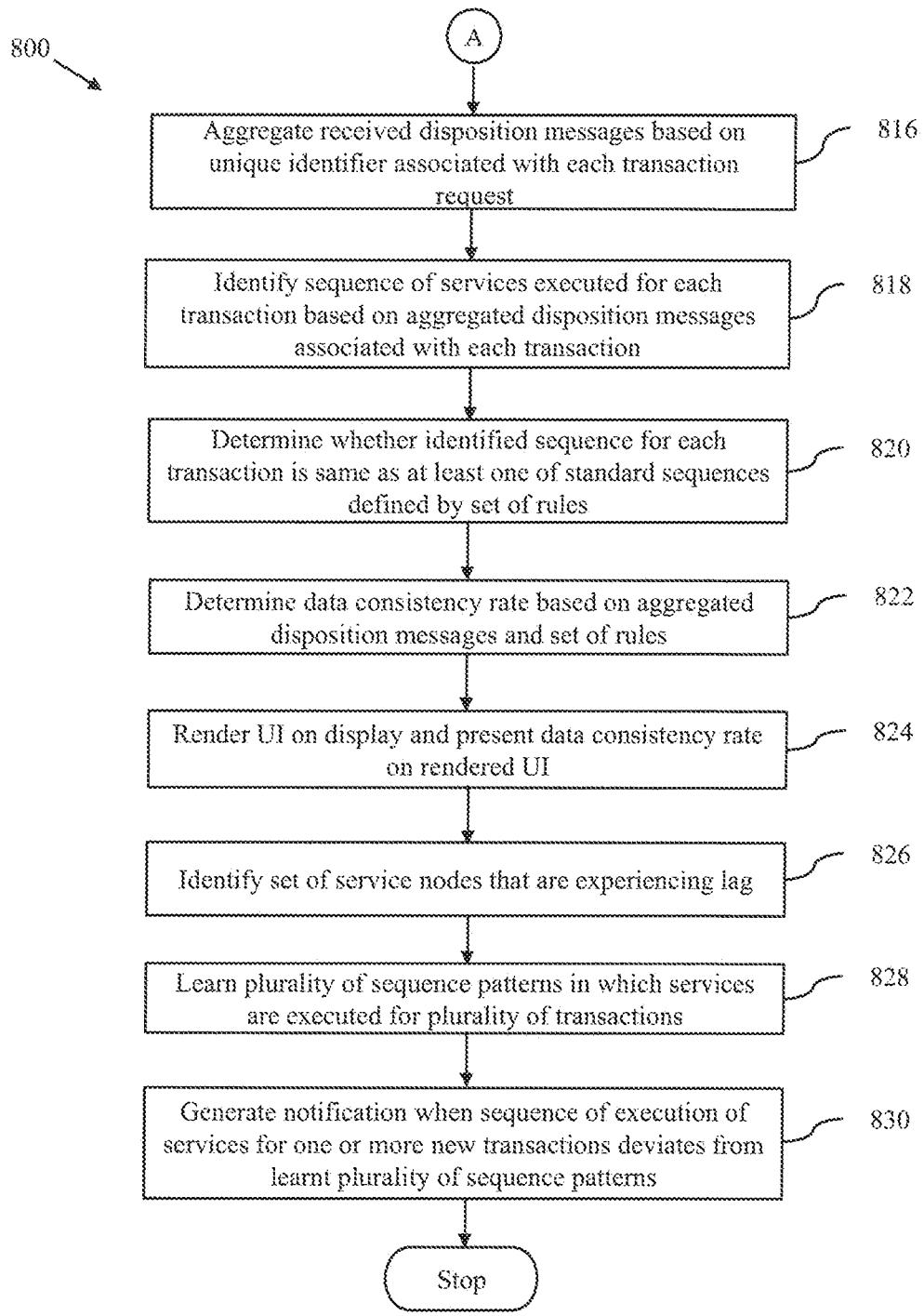

FIGS. 8A and 8B, collectively represent a flow chart 800 that illustrates a method for determining data consistency in a distributed asynchronous architecture, in accordance with an embodiment of the present disclosure.

At step 802, a plurality of transaction requests are received. The payment network server 108 (i.e., the edge node 210) may be configured to receive the plurality of transaction requests (e.g., the first and second transaction requests of FIG. 5) from the acquirer server 106. Each transaction request may be a request for authorization of a corresponding transaction. Each transaction request may invoke one or more services (e.g., the first through nineteenth services as shown in Table 400 of FIG. 4) offered by the payment network server 108 for processing the corresponding transaction. The payment network server 108 (i.e., the edge node 210) may assign a unique identifier to each transaction request, as described in FIGS. 6A-6C.

At step 804, the payment network server 108 (i.e., the orchestration service node 212) may identify a set of services (e.g., the first through nineteenth services) that is to be executed for processing each transaction corresponding to each transaction requests. In other words, the payment network server 108 (i.e., the orchestration service node 212) may identify, for each transaction, a set of nodes (e.g., the orchestration service node 212, the plurality of service nodes 214a-214s, or the like) for processing the corresponding transaction.

At step 806, the payment network server 108 (i.e., the edge node 210, the orchestration service node 212, or the plurality of service nodes 214a-214s) may execute the identified set of services for processing each transaction. At step 808, for each transaction, each node (for example, the edge node 210, the orchestration service node 212, the plurality of service nodes 214a-214s) may generate a service fulfilment response and a disposition message based on the execution of a corresponding service. Each disposition message may be indicative of a result of the execution of a corresponding service, a unique identifier of the corresponding transaction, and a timestamp indicative of a time of completion of the corresponding service. At step 810, based on the execution of the identified set of services for each transaction, the payment network server 108 may communicate transaction responses to the acquirer server 106. Each transaction response may indicate whether a corresponding transaction is approved or declined.

At step 812, the payment network server 108 (i.e., the DCM 216) may receive the generated disposition messages from the edge node 210, the orchestration service node 212, and/or the plurality of service nodes 214a-214s. The edge node 210, the orchestration service node 212, and/or the plurality of service nodes 214a-214s may communicate the generated disposition messages to the DCM 216 by way of the globally distributed event bus 218, as described in the foregoing descriptions of FIGS. 6A-6C. At step 814, the payment network server 108 (i.e., DCM 216) may store, in the second database 312 (for example, the distributed digital ledger), a record based on each received disposition message. Each record may be indicative of a corresponding disposition message.

With reference to FIG. 8B, at step 816, the payment network server 108 (i.e., the DCM 216) may aggregate the received disposition messages for each transaction based on the unique identifier of the corresponding transaction request. At step 818, the payment network server 108 (i.e., the DCM 216) may identify, based on the aggregated disposition messages, a sequence of services executed for processing each transaction. At step 820, the payment network server 108 (i.e., the DCM 216) may determine whether the identified sequence for each transaction is same as at least one of the various standard sequences defined by the set of rules. At step 822, the payment network server 108 (i.e., the DCM 216) may determine data consistency rate based on the aggregated received disposition messages and the set of rules (as described in the foregoing in FIGS. 6A-6C). At step 824, the payment network server 108 (i.e., the DCM 216) may render the first UI (e.g., the first and second UI screens 702 and 704 of FIG. 7) on the display and present the data consistency rate on the rendered UI (as described in FIG. 7).

At step 826, the payment network server 108 (i.e., the DCM 216) may identify a set of service nodes (e.g., the edge node 210, the orchestration service node 212, and/or the plurality of service nodes 214a-214s) that are experiencing a lag. The DCM 216 may identify the set of service nodes based on the aggregated disposition messages. At step 828, the payment network server 108 (i.e., the DCM 216) may learn a plurality of sequence patterns in which the services are executed for the plurality of transactions, based on the aggregated disposition messages associated with each transaction. The DCM 216 may utilize artificial intelligence (e.g., machine learning, deep learning, or the like) by way of one or more plugins to learn the sequence patterns. At step 830, the payment network server 108 (i.e., the DCM 216) may generate a notification when a sequence of execution of the services for one or more new transactions deviates from the learned plurality of sequence patterns. The DCM 216 may present the set of service nodes that are experiencing lag and the generated notification on the rendered UI.

Figure 9:
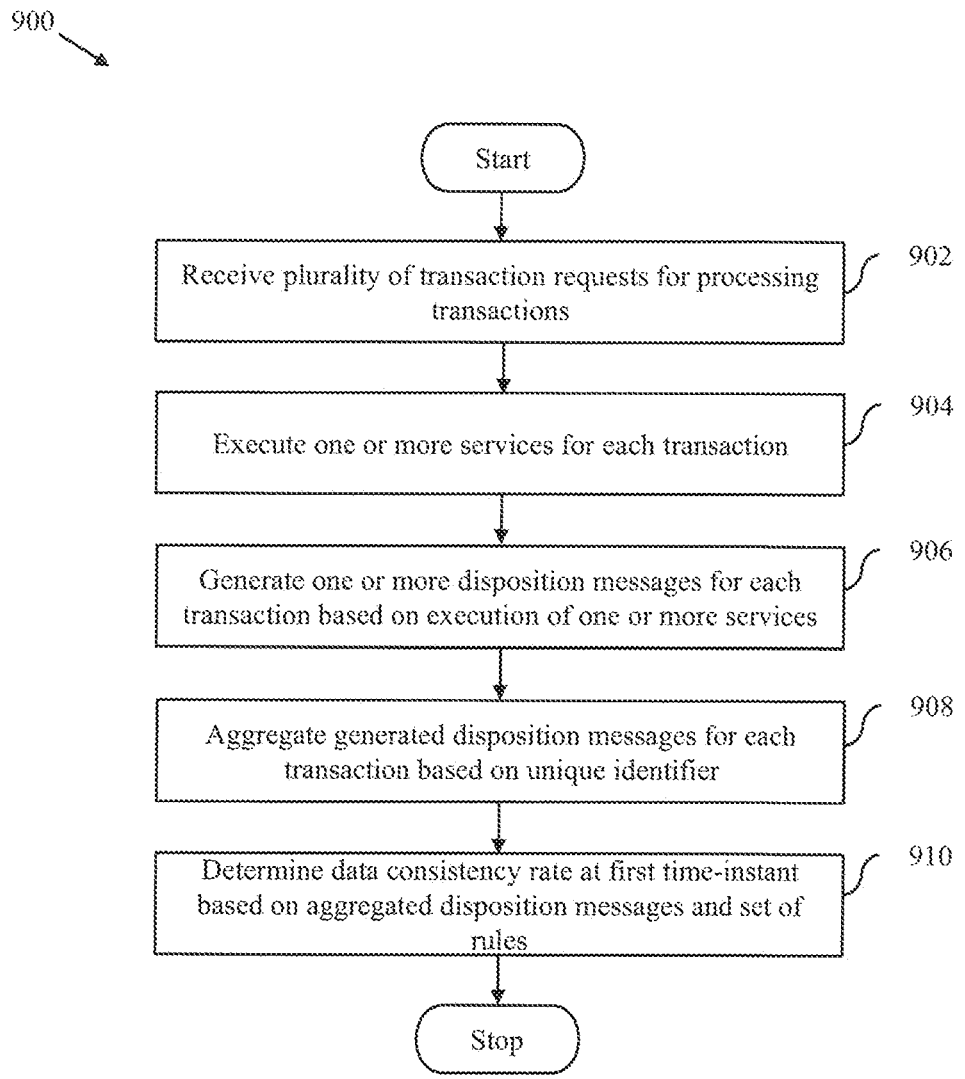
FIG. 9 represents a high-level flow chart that illustrates the method for determining data consistency in a distributed asynchronous architecture, in accordance with an embodiment of the present disclosure.

FIG. 9 represents a high-level flow chart 900 that illustrates the method for determining data consistency in a distributed asynchronous architecture, in accordance with an embodiment of the present disclosure.

At step 902, the payment network server 108 (i.e., the edge node 210) may receive a plurality of transaction requests (e.g., the first and second transaction requests) for processing of corresponding transactions (e.g., the first and second transactions) from the acquirer server 106. Each transaction request may invoke one or more services (e.g., the first through nineteenth services) offered by the payment network server 108 for processing the corresponding transaction. At step 904, the payment network server 108 (i.e., the orchestration service node 212 and the plurality of service nodes 214a-214s) may execute the one or more services for each transaction. Execution of a service for a transaction may constitute at least partial processing of the transaction.

At step 906, the payment network server 108 (i.e., the edge node 210, the orchestration service node 212, or the plurality of service nodes 214a-214s) may generate one or more disposition messages (e.g., the first through seventh disposition message of FIGS. 6A-6C) for each transaction based on the execution of the one or more services. Each disposition message may be indicative of a unique identifier of the corresponding transaction (e.g., the first transaction) and a timestamp indicative of a time of completion of the execution of a corresponding service. At step 908, the payment network server 108 (i.e., the DCM 216) may aggregate the generated disposition messages for each transaction based on the unique identifier of each transaction. At step 910, the payment network server 108 (i.e., the DCM 216) may identify the data consistency rate at the first time-instant based on the aggregated disposition messages for each transaction and the set of rules. The set of rules may define the various standard sequences for executing the one or more services (e.g., the first through nineteenth services as shown in Table 400 of FIG. 4) for processing each transaction.

Figure 10:
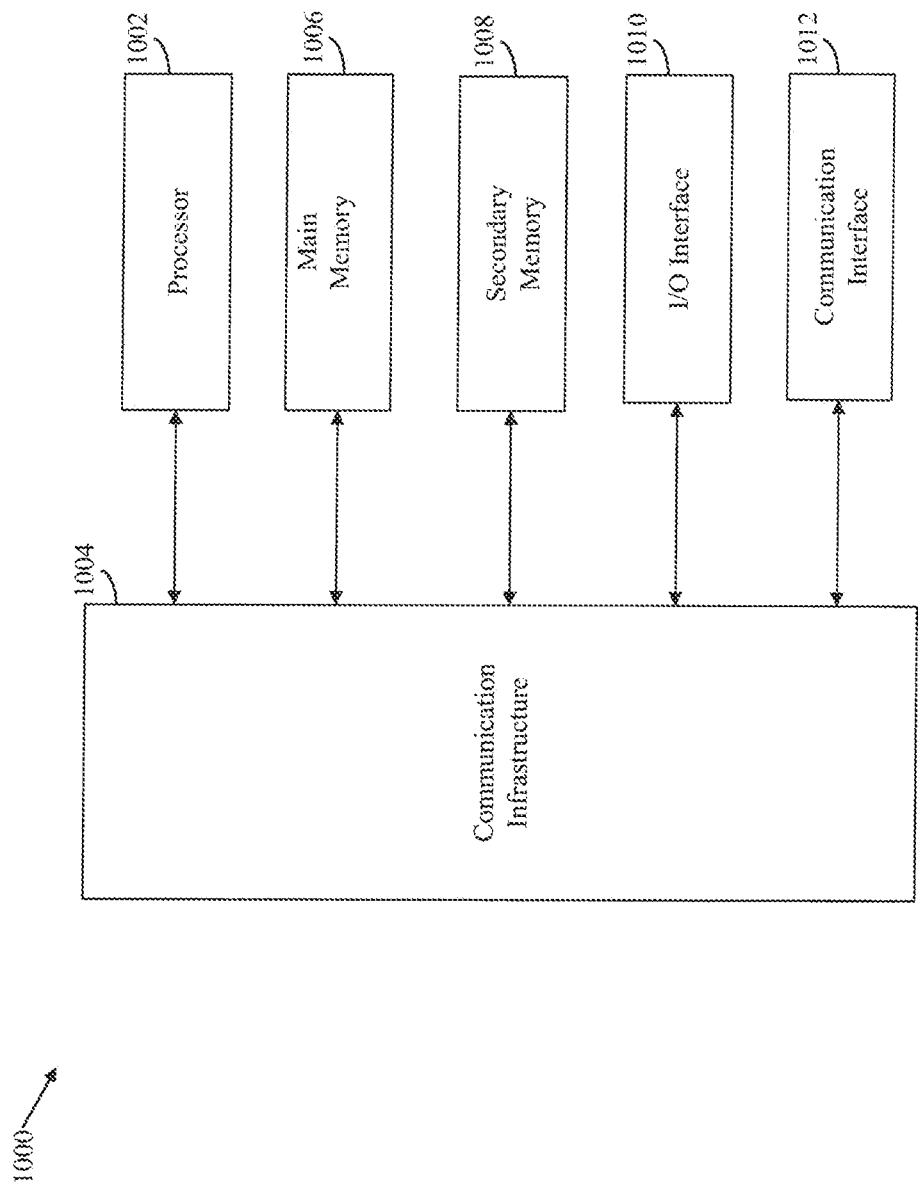
FIG. 10 is a block diagram that illustrates system architecture of a computer system, in accordance with an embodiment of the present disclosure.

FIG. 10 is a block diagram that illustrates system architecture of a computer system 1000, in accordance with an embodiment of the present disclosure. An embodiment of present disclosure, or portions thereof, may be implemented as computer readable code on the computer system 1000. In one example, the merchant server 102, the merchant device 104, the payment network server 108, and the issuer server 110 of FIG. 1 may be implemented in the computer system 1000 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 8A-8B and 9.

The computer system 1000 includes a processor 1002 that may be a special-purpose or a general-purpose processing device. The processor 1002 may be a single processor, multiple processors, or combinations thereof. The processor 1002 may have one or more processor cores. In one example, the processor 1002 is an octa-core processor. The processor 1002 may be connected to a communication infrastructure 1004, such as a bus, message queue, multi-core message-passing scheme, and the like. The computer system 1000 may further include a main memory 1006 and a secondary memory 1008. Examples of the main memory 1006 may include RAM, ROM, and the like. The secondary memory 1008 may include a hard disk drive or a removable storage drive, such as a floppy disk drive, a magnetic tape drive, a compact disc, an optical disk drive, a flash memory, and the like. The removable storage drive may read from and/or write to a removable storage device in a manner known in the art. In one example, if the removable storage drive is a compact disc drive, the removable storage device may be a compact disc. In an embodiment, the removable storage unit may be a non-transitory computer readable recording media.

The computer system 1000 further includes an input/output (I/O) interface 1010 and a communication interface 1012. The I/O interface 1010 includes various input and output devices that are configured to communicate with the processor 1002. Examples of the input devices may include a keyboard, a mouse, a joystick, a touchscreen, a microphone, and the like. Examples of the output devices may include a display screen, a speaker, headphones, and the like. The communication interface 1012 may be configured to allow data to be transferred between the computer system 1000 and various devices that are communicatively coupled to the computer system 1000. Examples of the communication interface 1012 may include a modem, a network interface, i.e., an Ethernet card, a communication port, and the like. Data transferred via the communication interface 1012 may correspond to signals, such as electronic, electromagnetic, optical, or other signals as will be apparent to a person skilled in the art. The signals may travel via a communication channel (not shown) which may be configured to transmit the signals to devices that are communicatively coupled to the computer system 1000. Examples of the communication channel may include, but are not limited to, cable, fiber optics, a phone line, a cellular phone link, a radio frequency link, and the like.

The main memory 1006 and the secondary memory 1008 may refer to non-transitory computer readable mediums. These non-transitory computer readable mediums may provide data that enables the computer system 1000 to implement the methods illustrated in FIGS. 8A-8B and 9. In an embodiment, the present disclosure is implemented using a computer implemented application, the computer implemented application may be stored in the main memory 1006 and/or the secondary memory 1008.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into digitally any device. For instant, at least one processor such as the processor 1002 and a memory such as the main memory 1006 and the secondary memory 1008 implements the above described embodiments. Further, the operations may be described as a sequential process, however some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Thus, the environment 100 enables determination of data consistency at the payment network server 108 which is a distributed network system based on asynchronous architecture. Technological improvements in the payment network server 108 (by way of the DCM 216 and the second database 312) allow the payment network server 108 to monitor a sequence of services executed for each transaction, enabling the payment network server 108 to determine (i.e., measure) the data consistency at any time-instant (e.g., a current time instant or a historical time-instant). Further, the payment network server 108 may determine data consistency, at any time-instant, at various levels. For example, the payment network server 108 may determine data consistency of individual switches (e.g., the first switch 108*a*), a group of switches (e.g., the first and second switches 108*a* and 108*b*), and a group of nodes of each switch. Determining data consistency and identifying nodes experiencing lag or high stress may allow an operator of the payment network server 108 to take corrective measures to improve processing times of transactions and data consistency rates. The solution provided by the disclosure can be scaled to include any number of switches and/or nodes without infrastructural upgrades.

Techniques consistent with the present disclosure provide, among other features, systems and methods for determining data consistency in a distributed asynchronous architecture. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

In the claims, the words 'comprising', 'including' and 'having' do not exclude the presence of other elements or steps then those listed in a claim. The terms "a" or "an", as used herein, are defined as one or more than one. Unless stated otherwise, terms such as "first" and "second" are used to arbitrarily distinguish between the elements such terms describe. Thus, these terms are not necessarily intended to indicate temporal or other prioritization of such elements. The fact that certain measures are recited in mutually different claims does not indicate that a combination of these measures cannot be used to advantage.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims.

What is claimed is:

1. A method for determining data consistency in a distributed asynchronous architecture, the method comprising:
receiving, by an edge node of a server, a plurality of transaction requests for processing a plurality of transactions, wherein each of the plurality of transaction requests invokes a plurality of services offered by the server for processing the plurality of transactions, the plurality of services including at least a first service and a second service;
for each transaction from among the plurality of transactions:
executing, asynchronously by a plurality of service nodes of the server, the plurality of services for the transaction, wherein the first service is executed by a first service node to process a first portion of the transaction and the second service is executed by a second service node to partially process another portion of the transaction;
generating, by the first service node, a first disposition message based on the execution of the first service, wherein the first disposition message includes a unique identifier of the transaction and a timestamp indicative of a time of completion of the execution of the first;
generating, by the second service node, a second disposition message based on the execution of the second service, wherein the second disposition message includes the unique identifier and a timestamp indicative of a time of completion of the execution of the second service;
aggregating, by a data consistency monitor (DCM) of the server, the generated first and second disposition messages-based on the corresponding unique identifier;
determining, by the DCM at a first time-instant, whether the asynchronously executed first service and second service were performed in a correct order based on the aggregated first and second disposition messages and a set of rules, wherein the set of rules defines one or more standard sequences that specify the correct order in which the invoked plurality of services are to be executed to be considered successful for a corresponding transaction from among the plurality of transactions; and generating, by the DCM, a data consistency rate based on the determination of whether the asynchronously executed first service and second service were performed in the correct order.

2. The method of claim 1, further comprising:
identifying, by the DCM, a sequence of the invoked one or more services executed for each of the plurality of transactions based on the aggregated one or more disposition messages; and
determining, by the DCM, whether the identified sequence of the invoked one or more services is same as at least one of the one or more standard sequences defined by the set of rules, for determining the data consistency rate.

3. The method of claim 1, wherein the data consistency rate at the first time-instant is indicative of at least a count of transactions of the plurality of transactions that are successfully processed, as per the set of rules, by the first time-instant.

4. The method of claim 1, further comprising receiving, by the DCM, the generated one or more disposition messages from the one or more service nodes, prior to aggregating the one or more disposition messages.

5. The method of claim 4, further comprising storing, by the DCM, one or more records in a database, wherein a record of the one or more records is indicative of a disposition message, of the one or more disposition messages, received by the DCM.

6. The method of claim 1, wherein at least one of the one or more service nodes is located at a first location that is different from a second location of remaining one or more service nodes.

7. The method of claim 1, further comprising rendering, by the DCM, a user interface (UI) on a display, for presenting the data consistency rate at the first time-instant.

8. The method of claim 7, further comprising:
identifying, by the DCM, a set of service nodes of the one or more service nodes that are experiencing a lag based on the aggregated one or more disposition messages; and
presenting, by the DCM, on the UI, one or more notifications indicative of the identified set of service nodes.

9. The method of claim 8, wherein the first time-instant is one of a current time-instant or a historical time-instant that is prior to the current time-instant.

10. The method of claim 1, further comprising:
learning, by the DCM, a plurality of sequence patterns in which the invoked one or more services are executed for each of the plurality of transactions, based on the aggregated one or more disposition messages; and
generating, by the DCM, a notification when a sequence of execution of the invoked one or more services for one or more new transactions deviates from the learned plurality of sequence patterns.

11. A system for determining data consistency in a distributed asynchronous architecture, the system comprising:
one or more processors executing an edge node, a plurality of service nodes, and a data consistency monitor (DCM),
wherein the edge node is configured to:
receive a plurality of transaction requests for processing a plurality of transactions, wherein each of the plurality of transaction requests invokes a plurality of services for processing the plurality of transactions, the plurality of services including at least a first service and a second service;
for each transaction from among the plurality of transactions:
execute, asynchronously by the plurality of service nodes, the plurality of services for the transaction, wherein the first service is executed by a first service node, from among the plurality of service nodes, to process a first portion of the transaction and the second service is executed by a second service node, from among the plurality of service nodes, to partially process another portion of the transaction;
generate, by the first service node, a first disposition message based on the execution of the first service, wherein the first disposition message includes a unique identifier of the transaction and a timestamp indicative of a time of completion of the execution of the first service;
generate, by the second service node, a second disposition message based on the execution of the second service, wherein the second disposition message includes the unique identifier and a timestamp indicative of a time of completion of the execution of the second service; and
wherein the DCM is communicatively coupled to the edge node and the plurality of service nodes, and is configured to:
aggregate the generated first and second disposition messages based on the corresponding unique identifier,
determine, at a first time-instant, whether the asynchronously executed first service and second service were performed in a correct order based on the aggregated first and second disposition messages and a set of rules, wherein the set of rules defines one or more standard sequences that specify the correct order in which the invoked plurality of services are to be executed to be considered successful for a corresponding transaction from among the plurality of transactions; and
generate a data consistency rate based on the determination of whether the asynchronously executed first service and second service were performed in the correct order.

12. The system of claim 11, wherein the DCM is further configured to:
identify a sequence of the invoked one or more services executed for each of the plurality of transactions based on the aggregated one or more disposition messages, and
determine whether the identified sequence of the invoked one or more services is same as at least one of the one or more standard sequences defined by the set of rules, for determining the data consistency rate.

13. The system of claim 11, wherein the DCM is further configured to:
learn a plurality of sequence patterns in which the invoked one or more services are executed for each of the plurality of transactions, based on the aggregated one or more disposition messages, and
generate a notification when a sequence of execution of the invoked one or more services for one or more new transactions deviates from the learned plurality of sequence patterns.

14. The system of claim 11, wherein the data consistency rate at the first time-instant is indicative of at least a count of transactions of the plurality of transactions that are successfully processed, as per the set of rules, by the first time-instant.

15. The system of claim 11, wherein the DCM is further configured to receive, from the one or more service nodes, the generated one or more disposition messages prior to the aggregation of the generated one or more disposition messages.

16. The system of claim 15, wherein the DCM is further configured to store one or more records in a database, wherein a record of the one or more records is indicative of a disposition message, of the one or more disposition messages, received by the DCM.

17. The system of claim 11, further comprising an event bus configured to communicatively couple the edge node, the one or more service nodes, and the DCM.

18. The system of claim 11, wherein the DCM is further configured to render, a user interface (UI) on a display for presenting the data consistency rate at the first time-instant.

19. The system of claim 18, wherein the DCM is further configured to:
- identify a set of service nodes of the one or more service nodes that are experiencing a lag based on the aggregated one or more disposition messages, and
- present, on the UI, one or more notifications indicative of the identified set of service nodes.

20. The system of claim 11, wherein the first service translates a first transaction request to a first message format compatible with the server and the second service determines routing information associated with the translated first transaction request.

\* \* \* \* \*